United States Patent [19]

Nakahara et al.

[11] Patent Number: 5,317,618
[45] Date of Patent: May 31, 1994

[54] LIGHT TRANSMISSION TYPE VACUUM SEPARATING WINDOW AND SOFT X-RAY TRANSMITTING WINDOW

[75] Inventors: Takehiko Nakahara; Masao Koshinaka; Nobuyuki Kosaka, all of Amagasaki, Japan

[73] Assignee: Mitsubishi Denki Kabushiki Kaisha, Tokyo, Japan

[21] Appl. No.: 4,596

[22] Filed: Jan. 14, 1993

[30] Foreign Application Priority Data

Jan. 17, 1992 [JP] Japan .................................. 4-006617
May 22, 1992 [JP] Japan .................................. 4-130581
Dec. 1, 1992 [JP] Japan .................................. 4-343525

[51] Int. Cl.$^5$ .............................................. G21K 1/00
[52] U.S. Cl. ........................................ 378/161; 378/140; 252/587; 252/588
[58] Field of Search .............. 378/161, 140; 252/582, 252/584, 587, 588, 589; 359/350

[56] References Cited

U.S. PATENT DOCUMENTS

| 4,398,152 | 8/1983 | Leveson ...................... 250/423 P X |
| 4,862,490 | 8/1989 | Karnezos et al. ...................... 378/161 |
| 5,031,199 | 7/1991 | Cole, III et al. ...................... 378/34 |
| 5,134,640 | 7/1992 | Hirokawa et al. . |

FOREIGN PATENT DOCUMENTS

| 3711293 | 10/1988 | Fed. Rep. of Germany . |
| 4117639 | 12/1991 | Fed. Rep. of Germany . |
| 63-64253 | 3/1988 | Japan . |
| 63-273100 | 11/1988 | Japan . |
| 1-9400 | 1/1989 | Japan . |
| 1-276550 | 11/1989 | Japan . |
| 1-272399 | 11/1990 | Japan . |
| 2-272400 | 11/1990 | Japan . |
| 3-128499 | 5/1991 | Japan . |
| 3-251800 | 11/1991 | Japan . |

OTHER PUBLICATIONS

Rosser, Feder, Adams, Celliers & Speer "Nondestructive Single-shot Soft X-ray Lithography ..." Applied Optics, Oct. 1, 1987.

Primary Examiner—David P. Porta
Attorney, Agent, or Firm—Wolf, Greenfield & Sacks

[57] ABSTRACT

A light transmission type vacuum separating window for separating a vacuum area into a plurality of vacuum areas through a film that transmits the light of a wavelength area such as an X-ray area and an infrared ray area. This vacuum separating window includes a thin film that transmits the light. The vacuum area is separated into the plurality of vacuum areas through this thin film. The light is any one of an X-ray, an infrared ray, a visible ray and an ultraviolet ray. A metal or an alloy that turns out a liquid in a range of temperature of a using environment may be provided between the thin film and the support member for supporting the thin film. This metal is preferably gallium. The alloy preferably contains gallium and, more preferably, consists of 75.5 weight % gallium and 24.5 weight % indium.

48 Claims, 14 Drawing Sheets

LIGHT TRANSMISSION TYPE VACUUM SEPARATING WINDOW AND SOFT X-RAY TRANSMITTING WINDOW

BACKGROUND OF THE INVENTION

1. Field of the Invention

The present invention relates to a light transmission type vacuum separating window for separating a vacuum area into a plurality of vacuum areas through a film that transmits the light of a wavelength range such as an X-ray range and an infrared ray range and to a soft X-ray transmitting window as well.

2. Related Background Art

In recent years, with an advancement of a high integration technology of electronic devices and semiconductors, a demand is to probe substance properties and physical phenomena in micro-areas by effecting hyperfine working. For probing the substance properties and physical phenomena in the micro-areas by the hyperfine working, synchrotron radiation rays and free electron laser beams are coming into a practical use. The synchrotron radiation rays and the free electron laser beams are defined as electromagnetic waves emitted in a direction of tangential line of a trajectory when the traveling direction of the electrons or positive electrons travelling at a velocity approximate to the speed of light velocity is deflected by a magnetic field generated by a deflection magnet. It is feasible to take out the electromagnetic waves of an X-ray range including a soft X-ray from an infrared ray range with a high intensity. Further, the characteristic is that the light (electromagnetic waves) taken out is deflected. As described above, the light intensity is much higher than that of any other light source. Under such circumstances, an attempt is going to be made, wherein the synchrotron radiation rays and the free electron laser beams are, though impossible in the prior art, applied to the hyperfine working process technology and the ultra high sensitivity measuring technology. In addition, a superprecise measurement that has hitherto been impossible can be performed by use of polarization of light. The attempt to apply the synchrotron radiation rays and the free electron laser beams to these areas is therefore going to be effected.

Normally, the synchrotron radiation rays and the free electron laser beams are taken into the atmosphere from a take-out window. The synchrotron radiation rays and the free electron laser beams are employed for the hyperfine working process technology, the ultra high sensitivity measuring technology and the superprecise measurement. By the way, in the above-described hyperfine working process technology, ultra high sensitivity measuring technology and superprecise measurement each using the synchrotron radiation rays and the free electron laser beams, the points at issue are an attenuation of light intensity and a distortion of polarized light in the window for taking out the synchrotron radiation rays and the free electron laser beams. Especially, the X-ray of the soft X-ray area is easily absorbed by a material of this window when passing through the window. Hence, there arises a problem that the light intensity is conspicuously attenuated. Further, when performing the superprecise measurement about substance properties or the like, the problems are the attenuation of light intensity and the distortion of polarized light in the light transmitting windows of a light source and of a detector. Besides, the synchrotron radiation rays and the free electron laser beams have high intensities. This presents a problem, wherein the window for taking out the light tends to be damaged by the radiation rays, particularly by the heat.

On the other hand, an accelerator serving as a light source of the synchrotron radiation rays and the free electron laser beams accelerates the electrons and positive electrons up to a velocity approximate to the speed of light. It is therefore required that the trajectory of the electrons or the positive electrons be in an ultra high vacuum on the order of $10^{-9}$ Torr ($1.33 \times 10^{-7}$ Pa) or greater to prevent the electrons and positive electrons from colliding with gas particles and resultantly disappearing or scattering midway. Besides, in a beam line for taking out the soft X-rays in a synchrotron radiation ray facility, particularly the X-ray of the soft X-ray range is easily absorbed by a gas in the vacuum. Since the light intensity is largely attenuated, it is required that a soft X-ray transmitting range be in an ultra high vacuum of the order of $10^{-7}$ Torr ($1.33 \times 10^{-5}$ Pa) or more. Then, the soft X-ray is taken out of this ultra high vacuum area by employing the soft X-ray transmitting window, with a lithography transfer device serving as a light source. A helium atmosphere on the order of 1013.3 mb is provided in this transfer device. A rise in temperature of a mask that is derived from an irradiation of radiant rays is prevented so as not to cause a distortion of a mask. Even in the helium atmosphere on the order of 1013.3 mb, an attempt to reduce a pressure of helium in the device is executed because of a large attenuation of the soft X-ray.

Further, the electromagnetic waves of the synchrotron radiation rays have continuous spectra and a high intensity and are therefore applied to a physicochemical analysis such as a structural analysis and a state analysis. A study for obtaining information that could not be obtained so far is going to be performed. In a soft X-ray detector employed for such analyses, a soft X-ray transmitting window for separating an ultra high vacuum area from a pressure reduction gas area is needed in a detection part of the detector having a pressure reduction gas as in, e.g., a gas-flow type detector.

Paying attention to the fact that the synchrotron radiation ray has a high intensity, other studies are also on the verge of practice, wherein a film deposition and substrate etching are performed by utilizing a photochemical reaction between the electromagnetic waves of the soft X-ray area and a gas substance. In this type of photochemical reaction device, the film deposition and etching are effected under depressurization in most cases. The soft X-ray transmitting window for separating the ultra high vacuum area from the pressure reduction gas area is needed when introducing the soft X-ray into the device via the beam line.

As described above, there is demanded the soft X-ray transmitting window for separating the ultra high vacuum area from the vacuum area such as the pressure reduction area with a highly efficient transmission of the X-ray of the soft X-ray area without attenuation, wherein baking necessary for attaining a further ultra high vacuum is performable.

As shown in a magazine ([Applied Physics], Vol. 5 (published in 1986) p. 494), a conventionally manufactured apparatus is constructed as follows. A beryllium foil serving as a soft X-ray transmitting window constructive member is joined to an opening of an ultra high vacuum flange by methods such as soldering and electron beam welding. An airtightness is thus kept. Alternatively, after joining to a window frame of copper, etc. has been conducted by the same method, this is fixedly welded to the ultra high vacuum flange to hold the airtightness. Metal beryllium, however, has a high melting point but exhibits poor properties in terms of ductility and malleability. Hence, a breakdown such as a crack may easily occur in the beryllium foil in the method of directly welding to well-utilized stainless steel as an ultra high vacuum material. Then, as disclosed in Japanese Patent Laid-Open Publication No. 63-64253, titled [Soft X-Ray Take-Out Window], a member joined to a free oxygen copper plate by the diffused junction method is used as a gasket. Additionally, as disclosed in Japanese Patent Laid-Open Publication No. 63-273100, titled [Soft X-Ray Take-Out Window Structure and Manufacturing Method thereof], the following method is proposed. A beryllium foil having a thickness of 200 $\mu$m is airtightly soldered to the stainless steel. Thereafter, cracking in the beryllium foil when welded is prevented by reducing the thickness of the soft X-ray transmitting area with physicochemical process working.

Further, as disclosed in Japanese Patent Laid-Open Publication No. 1-276550, titled [Soft X-ray Take-Out Window and Manufacturing Method thereof], the following method is also proposed as a method of avoiding the stress generated during a welding process. A metal elastic member deformable in a direction parallel to an opening surface is soldered to the beryllium foil and the stainless steel, thus avoiding the stress. A durability of the beryllium foil is thereby improved. The diffused junction method, the electron beam welding and the soldering as employed above, however, present such problems that beryllium starts being recrystallized enough to decrease the intensity because of heating beryllium at 700° C. or more. Deterioration and cracking are both occur easily. Then, a method of keeping the airtightness without heating the beryllium foil is proposed. As disclosed in Japanese Patent Laid-Open Publication No. 1-9400, titled [Soft X-Ray Take-Out Window], the airtightness is kept by use of a fluorine rubber O-ring as an elastic member vacuum sealing medium. In this method, however, it is necessary to apply a force enough to keep the airtightness on the elastic member and the beryllium foil as well. It is difficult to reduce a thickness of the beryllium foil.

In addition, as disclosed in Japanese Patent Laid-Open Publication No. 2-272399, titled [Soft X-Ray Take-Out Window] and Japanese Patent Laid-Open Publication No. 2-272400, titled [Soft X-Ray Take-Out Window], there are proposed methods of keeping the airtightness by use of a metals exhibiting a predetermined consistency and vapor pressure characteristic in place of the O-ring. It is also difficult to reduce the thickness of the beryllium foil because of enhancing the airtightness by applying the force on the beryllium foil. Then, the following method is proposed. As disclosed in Japanese Patent Laid-Open Publication No. 3-128499, titled [Radiation Ray Transmitting Thin Film Manufacturing Method and Radiation Ray Transmitting Window Having Radiation Ray Transmitting Thin Film Manufactured by the Same Method], a beryllium film is vacuum-deposited on free oxygen copper without using the beryllium foil. Thereafter, the free oxygen copper of the window member is etched by use of concentrated nitric acid. The beryllium film of 20 $\mu$m is thus obtained. The airtightness of the thus formed soft X-ray transmitting window constructive member is held by employing the fluorine rubber O-ring.

As explained above, a large variety of X-ray transmitting windows have been proposed, wherein the ultra high vacuum is kept by separating the atmospheric pressure area from the ultra high vacuum area. It is, however, difficult in terms of reliability to reduce the thickness of the beryllium foil or beryllium film down to 20 $\mu$m or less in order to separate the atmospheric pressure area from the ultra high vacuum area. Hence, this leads to a difficulty to efficiently transmit the soft X-ray because of a large absorption of the soft X-ray in the transmitting window.

By the way, some attempts are conducted presently, wherein the attenuation of the X-ray of the soft X-ray range is prevented by use of a thin film composed of silicon nitride, silicon carbide, boron nitride, diamond, etc. A film as thin as several $\mu$m$-0.1$ $\mu$m can be formed. For example, in the case of an X-ray having an energy of 1 kev, conventionally employed beryllium having a thickness of 20 $\mu$m exhibits a transmittance of 11%. Contrastingly, a boron nitride thin film having a thickness of 1 $\mu$m exhibits a transmittance of 65%. A silicon nitride thin film having a thickness of 1 $\mu$m shows a transmittance of 51%. Further, in the case of an X-ray having an energy of 500 eV, beryllium having a thickness of 20 $\mu$m exhibits a transmittance of $6 \times 10^{-7}$%. In contrast, the 1 $\mu$m boron nitride thin film has a transmittance of 7.8%. The 1 $\mu$m silicon nitride thin film has a transmittance of 2.1%. A highly efficient transmission of the soft X-ray is obtained. It is therefore possible to employ the thin films composed of silicon nitride, silicon carbide, boron nitride, diamond, etc. as a soft X-ray transmitting thin film member.

FIG. 24 is a sectional view illustrating a structure of the above-mentioned conventional soft X-ray transmitting thin film member. Referring to FIG. 24, a soft X-ray transmitting thin film 32 is supported on a support substance 31. Speaking of sizes of these components, for example, the support substance 31 has a diameter of 40 mm; a transmitting part has a diameter of 20 mm; and the soft X-ray transmitting thin film 32 has a thickness of 1 $\mu$m. Generally, for simplicity of manufacturing, the support substance 31 is composed of silicon, while the soft X-ray transmitting thin film 32 is formed of a silicon nitride thin film. The thus constructed soft X-ray transmitting thin film member is joined to an ultra high vacuum structure of stainless steel or an aluminum alloy. For this purpose, the soldering and the electron beam welding involve difficulty. Then, an attempt to use an epoxy resin is going to be made.

Further, in connection with an infrared ray transmitting window, as shown in, e.g., p.372 of [Applied Spectroscopy Hand Book] (published by Asakura Shoten, 1984), an infrared ray detector is exemplified. The infrared ray transmitting window has a thickness of several mm for separating the vacuum on the side of the infrared ray detector from the atmosphere. In addition, materials employed for this infrared ray transmitting window are potassium bromide or cesium bromide having a long wavelength limit in the majority of cases as reported in the magazine ([Applied Physics] Vol. 5 (published in 1986) p. 492).

Further, a substrate temperature when forming the film is required to be precisely controlled in the film forming process of a semiconductor or the like. Proposed with this necessity is a radiation thermometer in which the infrared ray transmitting window involves the use of zinc selenide (ZnSe) having a very large transmission area in the film forming processor.

This film forming process of the semiconductor requires the precise control of the film thickness when forming the film. Therefore, the film forming processor is mounted with an ellipsometer for measuring a thickness of the formed film.

In addition, as shown in, e.g., [UHV COMPONENTS technical data] "UHV Viewports and viewport Shutters" (published by VACUUM GENERATORS Co., Ltd), a visible ray transmitting window is constructed by fusing, to a flange member, a window material such as a glass plate, a quartz plate, a sapphire plate, etc.

The conventional soft X-ray transmitting thin film member is thus constructed, and hence the epoxy resin classified as an organic substance easily undergoes a deterioration in radiation relative to the X-ray. The conventional soft X-ray transmitting thin film member presents a problem with respect to a long-term reliability. Moreover, the epoxy resin decompose easily at a high temperature. The epoxy resin is decomposed during a baking process conducted for obtaining an ultra high vacuum, with the result that a gas is evolved.

Additionally, the conventional infrared ray transmitting window has a problem. The substances such as potassium bromide and cesium bromide are vulnerable to moisture. A careful treatment is needed for dewing or the like caused by cooling of the detector.

A further problem is that zinc (Zn) and selenium (Se) of zinc selenide used for the window material are high of vapor pressure; and these elements are taken in as impurities during sample manufacturing.

The conventional infrared ray transmitting window presents the problems as described above. The materials are confined to those having a high transmittance of the infrared ray. Therefore, the careful treatment is needed. In addition, where the infrared ray transmitting window material contains substances having a high vapor pressure, these substances are taken in as impurities when manufacturing the sample.

Furthermore, the conventional visible ray transmitting window has the following problems. The stress is applied on the window material enough to cause double refraction. Besides, there has been practiced the method of keeping the airtightness of the window material such as the glass plate, the quartz plate and the sapphire plate by the O-ring or the like. However, it is necessary to apply enough force to keep the airtightness on the window material such as the glass plate, the quartz plate and the sapphire plate. The stress acts on the window material, with result that the double refraction is produced.

Further, in conventional ellipsometer also, the precise measurement is difficult because of such a defect that the above-described double refraction is caused.

Moreover, the vacuum ultraviolet transmitting window also presents the same problems as those of the infrared ray transmitting window and the visible ray transmitting window.

Further, in the conventional light transmitting window, it is difficult in terms of reliability to set the thickness of the light transmitting window constructive member to 20 $\mu$m or less in order to separate the atmospheric pressure area from the vacuum area. For this reason, it is difficult to efficiently transmit the soft X-ray and the infrared ray because of the large absorption of the soft X-ray and the infrared ray in the transmitting window. The absorption of the infrared ray, etc. in the transmitting window is large. Hence, there arises such a problem that materials for the light transmitting window constructive member are limited. Additionally, the distortion and scatter of light in the transmitting window are reduced with difficulty.

Employed are the methods of fusing the window material to the flange member and keeping the airtightness by the O-ring. Consequently, the problem is caused, wherein the stress is applied on window material enough to cause the double refraction.

The following are additional problems. The synchrotron radiation rays and free electron laser beams have the high intensities. Hence, the window for taking out the light easily undergoes damage by the radiation ray, especially by the heat. The window tends to be damaged during the baking process for obtaining the ultra high vacuum.

SUMMARY OF THE INVENTION

It is a primary object of the present invention, which has been devised to obviate the problems described above, to provide a light transmission type vacuum separating window for separating a vacuum by use of a film that efficiently transmits the light such as an X-ray including an X-ray of a soft X-ray range and an infrared ray.

It is another object of the present invention to provide a light transmission type vacuum separating window for separating the vacuum by use of a thin film having a thickness enough to reduce a distortion and scatter of light.

It is still another object of the present invention to provide a light transmission type vacuum separating window for separating the vacuum by use of a thin film exhibiting a heat resistant property.

It is a further object of the present invention to provide a light transmission type vacuum separating window in which at least one of separated vacuums is an ultra high vacuum.

It is a still further object of the present invention to provide a light transmission type vacuum separating window for separating the vacuum by use of a thick film or a thick film member that efficiently transmits the light such as an X-ray including an X-ray of a soft X-ray range and an infrared ray, wherein no double refraction occurs.

It is a yet further object of the present invention to provide a soft X-ray transmitting window in which a highly efficient transmission of an X-ray of a soft X-ray range is performed, an airtightness between an ultra high vacuum area and a pressure reduction area is held, and further baking required for creating an ultra high vacuum is performable.

To accomplish the objects given above, according to one aspect of the invention, there is provided a light transmission type vacuum separating window comprising: a thin film transmitting the light; and a support substance for supporting the thin film, whereby partitioning into a plurality of vacuum areas is effected.

According to another aspect of the invention, there is provided a light transmission type vacuum separating window comprising: a thick film transmitting the light; a support member for supporting the thick film; and a metal or an alloy provided between the thick film and the support member and turning out a liquid in a range of temperatures of a using environment, whereby partitween the support member and the thin film or the thin film member. Therefore, the thickness of the light transmitting thin film can be reduced as much as possible. It is feasible to efficiently transmit the light such as the X-ray of the soft X-ray area and the infrared ray. Further, it is also feasible to remarkably reduce a rate at which the light undergoes the distortion in the thin film. Besides, an amount of scatter of light in the thin film can be decreased. In addition, gallium or the alloy containing gallium has the viscosity and the surface tension when fused. Hence, the vacuums can be separated. Further, gallium or the alloy containing gallium has the low vapor pressure even at the baking temperature but does not therefore contaminate the ultra high vacuum during baking. Baking needed for reaching the ultra high vacuum can be effected.

Further, in the light transmission type vacuum separating window according to the present invention, an alloy containing gallium consists of either the gallium-indium alloy or the gallium-tin alloy. As known from state diagrams of, e.g., FIGS. 25 and 26, in gallium-indium alloys, an alloy having an indium weight percentage smaller than about 30% exhibits a melting point of 15.7°–29.8° C. Further, in gallium-tin alloys, an alloy having a tin weight percentage smaller than about 15% exhibits a melting point of 20.5°–29.8° C. lower than 29.8° C., i.e., the melting point of gallium. The alloy is fused when baked. No stress is applied on the thin film due to a difference in the thermal expansion coefficient between the thin film or the thin film member and the support member. Therefore, a thickness of the thin film can be reduced as much as possible. It is feasible to efficiently transmit the X-ray of the soft X-ray area and the infrared ray as well. Besides, a rate at which the light undergoes the distortion in the thin film is remarkably decreased. An amount of scatter of light in the thin film is also reduced.

Further, the gallium-indium alloy and the gallium-tin alloy have the viscosity and the surface tension when fused. The vacuums are thus separated. Moreover, the gallium-indium alloy and the gallium-tin alloy have the low vapor pressure even at the baking temperature but do not therefore contaminate the ultra high vacuum during the baking process. Baking needed for attaining the ultra high vacuum is performable. Note that FIGS. 22 and 23 are cited from a publication titled ([Metal Data Book]), edited by Nippon Metal Academic Society (Corporation) (pp. 499–450, published by Maruzen, 1974).

Further, in the light transmission type vacuum separating window according to the present invention, the gallium-indium alloy is an alloy containing 75.5 weight % gallium and 24.5 weight % indium. The melting point is thereby reduced down to 15.7° C. Hence, the alloy which has been once liquefied when baked exists in the as-liquefied state due to a supercooling phenomenon even when the temperature becomes the melting point or under, e.g., 10° C. For this reason, the alloy is not solidified in the as-liquefied state in an installation location of ordinary experimental equipment. The stress due to variations in volume of the alloy that are caused during the solidification is not applied on the thin film. Hence, the thickness of the thin film can be further reduced. It is therefore possible to efficiently transmit the light such as the X-ray of the soft X-ray range and the infrared ray. Further, the rate at which the light undergoes the distortion in the thin film is decreased. The amount of scatter of light in the thin film is also decreased. Besides, the alloy is a liquid in the normally employed laboratory and can be therefore coated on the support member without being heated up. Additionally, both gallium and indium are low of vapor pressure but do not therefore contaminate the ultra high vacuum.

Further, in the light transmission type vacuum separating window according to the present invention, at least any one of the plurality of vacuum areas is set as an ultra high vacuum area on the order of $10^{-7}$ Torr or more. The ultra high vacuum area is thus separated from the vacuum area. The transmittance of light in the light transmission type vacuum separating window is further increased. Hence, the light transmitting window with a small attenuation of intensity and a small distortion is attainable when applied to the soft X-ray transmitting window wherein the problems are the attenuation of light intensity and the distortion in the light transmitting window.

Further, in the light transmission type vacuum separating window according to the present invention, the alloy consisting of the metal or the alloy that turns out a liquid in the range of temperatures of the using environment is provided between the thick film transmitting the light and the support member. There is no need to apply the stress associated with the fusion and sealing at the O-ring on the thick film. No double refraction occurs. Furthermore, the stress is prevented from acting on the thick film due to the difference in the thermal expansion coefficient between the support member and the thick film during the baking process needed for the ultra high vacuum. The thick film is thus prevented from being damaged.

Further, in the light transmission type vacuum separating window according to the present invention, the metal is gallium, and the alloy is an alloy containing gallium. The stress associated with the fusion or sealing in the O-ring is not applied on the thick film or the thick film member. No double refraction is caused. Besides, gallium or the alloy containing gallium is easily fused during the baking process. There is no possibility in which the stress acts on the light transmitting thick film due to the difference in the thermal expansion coefficient between the thick film or the thick film member and the support member. Consequently, the light transmitting thick film is not broken. Besides, gallium or the alloy containing gallium has the viscosity and the surface tension when fused. The vacuums are thus separated. Further, gallium or the alloy containing gallium is low of vapor pressure even at the baking temperature but does not therefore contaminate the ultra high vacuum during the baking process. Baking required for reaching the ultra high vacuum is performable.

Further, in the light transmission type vacuum separating window according to the present invention, the alloy containing gallium is either the gallium-indium alloy or the gallium-tin alloy. As known from the stage diagrams of, e.g., FIGS. 25 and 26, in the gallium-indium alloys, an alloy having an indium weight percentage smaller than about 30% exhibits a melting point of 15.7°–29.8° C. Further, in the gallium-tin alloys, an alloy having a tin weight percentage smaller than about 15% exhibits a melting point of 20.5°–29.8° C. lower than 29.8° C., i.e., the melting point of gallium. The alloys are fused when baked. The stress is not applied on the thick film due to the difference in the thermal expansion coefficient between the thick film or the thick film member and the support member. Moreover, the rate at which the light undergoes the distortion in the thick film is remarkably reduced. Besides, the amount of scatter of light in the thick film is decreased.

Further, the gallium-indium alloy and the gallium-tin alloy have the viscosity and the surface tension when fused. The vacuums are thus separated. Additionally, the gallium-indium alloy and the gallium-tin alloy are low of vapor pressure even at the baking temperature but do not therefore contaminate the ultra high vacuum during the baking process. Baking necessary for reaching the ultra high vacuum is performable.

Further, in the light transmission type vacuum separating window according to the present invention, the gallium-indium alloy is an alloy containing 75.5 weight % gallium and 24.5 weight % indium. The melting point is therefore reduced down to 15.7° C.

Hence, for instance, the alloy which has been once liquified during the baking process exists in the as-liquefied state due to the supercooling phenomenon even when the temperature becomes the melting point or under, e.g., 10° C. For this reason, the alloy is not solidified in the as-liquefied state in the installation location of ordinary experiment equipment. The stress due to variations in volume of the alloy that are caused during the solidification does not act on the thick film. Hence, no double refraction occur in the thick film or the thick film member. Besides, the alloy can be coated on the support member without being heated up. Moreover, both gallium and indium are low of vapor pressure but do not therefore contaminate the ultra high vacuum.

Further, in the light transmission type vacuum separating window according to the present invention, at least any one of the plurality of vacuum areas is set as an ultra high vacuum area on the order of $10^{-7}$ Torr or more. The ultra high vacuum area is thus separated from the vacuum area. The transmittance of light in the light transmission type vacuum separating window is further enhanced.

Further, in the soft X-ray transmitting window according to the present invention, the soft X-ray transmitting window constructive member is joined to the support member through gallium. Gallium has a melting point of 29.8° C. and is therefore liquefied during the baking process. The stress is not applied on the soft X-ray transmitting film due to the difference in the thermal expansion coefficient between the soft X-ray transmitting window constructive member and the support member. Hence, the thickness of the soft X-ray transmitting film can be reduced to the greatest possible degree. It is therefore feasible to efficiently transmit the X-ray of the soft X-ray range. Besides, gallium has the viscosity and the surface tension when liquefied. The airtightness between the pressure reduction area and the ultra high vacuum area can be kept. Furthermore, gallium is low of vapor pressure even at the baking temperature but does not therefore contaminate the ultra high vacuum during the baking process. Baking needed for reaching the ultra high vacuum is performable.

In addition, the soft X-ray transmitting window constructive member is joined to the support member through the alloy containing gallium. Hence, during the baking process, as known from the state diagrams of, e.g., FIGS. 25 and 26, in the alloy containing gallium i.e., gallium-indium alloys, an alloy having an indium weight percentage smaller than about 30% exhibits a melting point of 15.7°-29.8° C. Further, in the gallium-tin alloys, an alloy having a tin weight percentage smaller than about 15% exhibits a melting point of 20.5°-29.8° C. lower than 29.8° C., i.e., the melting point of gallium. The alloys are liquefied when baked. The stress is not applied on the soft X-ray transmitting film due to the difference in the thermal expansion coefficient between the soft X-ray transmitting window constructive member and the support member.

Hence, the thickness of the soft X-ray transmitting film can be reduced as much as possible. It is therefore feasible to efficiently transmit the X-ray of the soft X-ray range. In addition, the alloys containing gallium, e.g., the gallium-indium alloy and the gallium-tin alloy have the viscosity and the surface tension when liquefied. The airtightness between the pressure reduction area and the ultra high vacuum area can be therefore kept. Further, the alloys containing gallium, e.g., the gallium-indium alloy and the gallium-tin alloy are low of vapor pressure even at the baking temperature but do not therefore contaminate the ultra high vacuum during the baking process. Baking necessary for reaching the ultra high vacuum is performable.

Further, in the soft X-ray transmitting window according to the present invention, joining is effected by use of the alloy consisting of 75.5 weight % gallium and 24.5 weight % indium. The alloy having a melting point of 15.7° C. which has been once liquefied exists in the as-liquefied state due to the supercooling phenomenon even when the temperature comes to the melting point or under, e.g., 10° C. For this reason, the alloy is not solidified in the as-liquefied state in the installation location of ordinary experimental equipment. The stress due to variations in volume of the alloy that are caused during the solidification is not applied on the soft X-ray transmitting film. Hence, the thickness of the soft X-ray transmitting film can be further reduced. It is therefore possible to efficiently the X-ray of the soft X-ray area.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Example 1

Embodiments of the present invention will hereafter be described with reference to the drawings.

Figure 1:
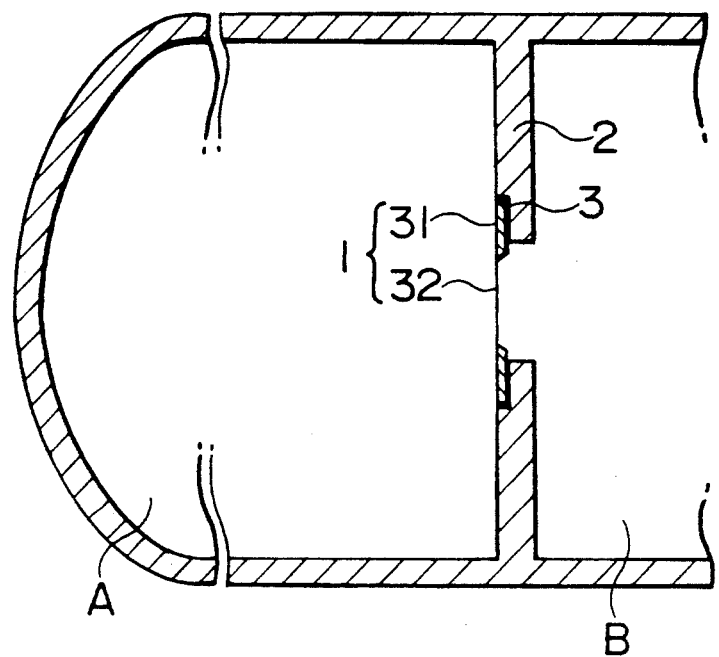
FIG. 1 is a sectional view illustrating a soft X-ray transmitting window in one example of this invention.
Figure 24:
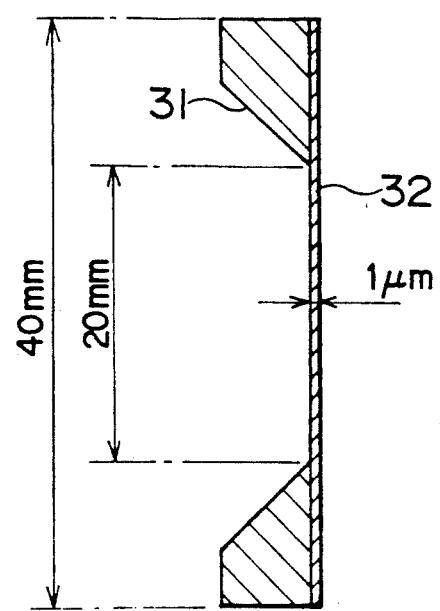
FIG. 24 is a sectional view showing one example of soft X-ray transmitting thin film members according to the present invention and the prior art.

FIG. 1 is a sectional view illustrating a soft X-ray transmitting window in an example 1 of this invention. The same components as those in FIG. 24 are marked with the like symbols, and the explanations thereof will be omitted.

Referring to FIG. 1, the symbol A designates a pressure reduction area in a vacuum chamber, and B represents an ultra high vacuum area.

A soft X-ray transmitting thin film member 1 is constructed of a support substance 31 composed of silicon and a soft X-ray transmitting thin film 32 composed of silicon nitride. A support member 2 including an opening supports the soft X-ray transmitting thin film member 1. The support member 2 is composed of, e.g., an ultra high vacuum structure of a stainless steel, aluminum alloy, etc..

The pressure reduction area A is herein an area having a degree of vacuum on the order of several Torr. The ultra high vacuum area B is an area having a degree of vacuum on the order of $10^{-7}$ Torr or greater ($1.33 \times 10^{-5}$ Pa or greater).

Next, a method of manufacturing this soft X-ray transmitting window and the operation thereof will be explained. The support member 2 is, when heated up, coated with gallium 3. The soft X-ray transmitting thin film member 1 is then joined. The vacuum chamber is baked normally at 150° C. The gallium 3 is fused when baked. Hence, there exists no possibility, wherein a stress is applied on the soft X-ray transmitting thin film 32 due to a difference in thermal expansion coefficient between the soft X-ray transmitting thin film member 1 and the support member 2, with the result that the film 32 is damaged. Further, a viscosity of gallium when fused is 1.4 mN·s/m² at 150° C. A surface tension thereof is 706 mN/m. For instance, this type of soft X-ray transmitting thin film member 1 is joined to ICF152 flange of stainless steel (SUS304) by use of gallium. Even when baked at 150° C., gallium does not flow out, and this soft X-ray transmitting thin film member 1 is not peeled off. The vacuum of the ultra high vacuum area B can be separated from that of the pressure reduction area A. Further, a vapor pressure of gallium is $10^{-10}$ Torr or under at 150° C. Therefore, the ultra high vacuum is not contaminated during baking required for attaining the ultra high vacuum.

Example 2

Figure 2:
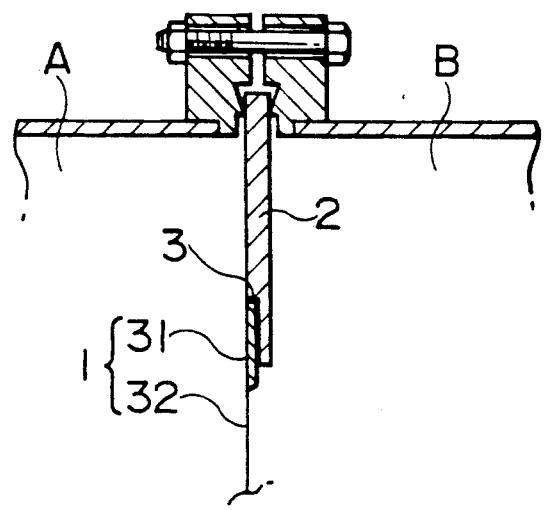
FIG. 2 is a sectional view illustrating the principal portion of the soft X-ray transmitting window in another example of this invention.

FIG. 2 is a sectional view illustrating the principal portion of the soft X-ray transmitting window in another example of this invention.

Note that the same components as those in FIG. 1 are marked with the like symbols in FIG. 2. This support member 2 is composed of oxygen free copper or an aluminum alloy, etc. and serves as a gasket.

In this type of soft X-ray transmitting window also, the same effects as those in the example 1 can be obtained.

Incidentally, in accordance with each example discussed above, the support member 2 is formed with a receiving part for receiving the soft X-ray transmitting thin film member 1 so that the soft X-ray transmitting thin film member 1 is not peeled off or slipped off. However, the soft X-ray lamp or the thin film member 1 may be arranged to be lightly pressed by a presser bar or the like.

Note that in accordance with each example discussed above, there is shown one example of joining the soft X-ray transmitting thin film member 1 comprising the support substance 31 composed of silicon and the soft X-ray transmitting think film 32 composed of the silicon nitride tin film by use of gallium 3. The support substance 31 is not, however, limited to silicon. Further, the soft X-ray transmitting thin film 32 may be composed of a boron nitride thin film, silicon carbide thin film and a diamond thin film. The soft X-ray transmitting finn film 32 is not limited to the silicon nitride thin film. particularly, the diamond thin film containing a good deal of carbon having an atomic weight of 13 exhibits a high thermal conductivity. The diamond thin film is capable of efficiently diffusing the heat generated by an irradiation of emitted light in the soft X-ray transmitting thin film 32. Further, the same effects are obtained even when joining a soft X-ray transmitting thin film member constructed of a support substance composed of oxygen free copper or nickel and a beryllium thin film by use of gallium. Besides, the same effects are, as a matter of course, obtained even when joining a thin beryllium foil serving as a soft X-ray transmitting thin film member by use of gallium.

Effected is such a treatment that gallium 3 is easy to wet and has a good adhesion to the joining parts of the support member 2 and the soft X-ray transmitting thin film member 1. For instance, nickel is plated on the surface of the joining part of the support member 2. An airtightness may be thus enhanced by increasing the joining property.

Example 3

Figure 3:
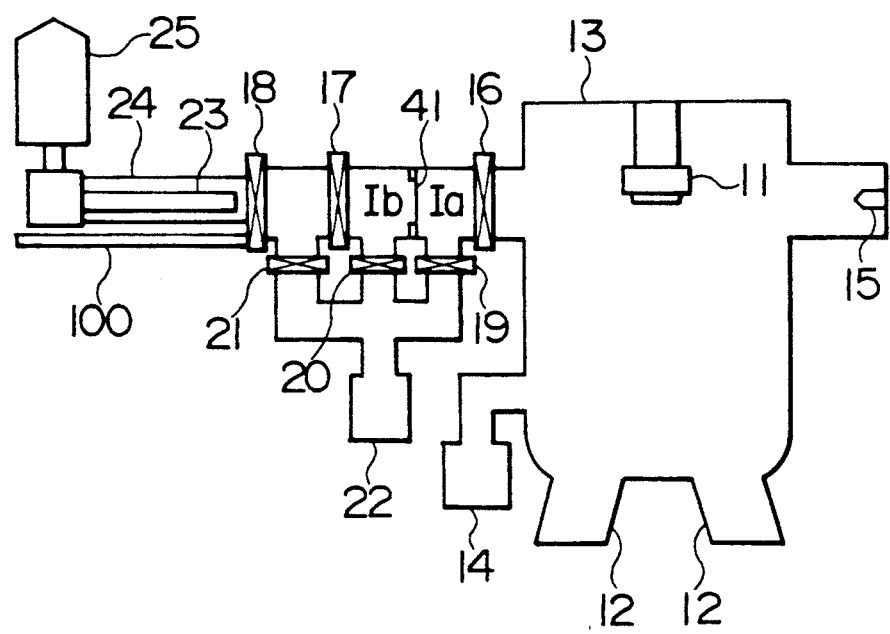
FIG. 3 is a block diagram in section showing one example where the soft X-ray transmitting window of this invention is applied to an ultra high vacuum processor mounted with an X-ray measuring device.

FIG. 3 is a block diagram in section showing one example where the soft X-ray transmitting window of the present invention is applied to an ultra high vacuum processor mounted with an X-ray measuring device. Referring to FIG. 3, the numeral 11 denotes a sample; 12 a sample manufacturing mechanism; 13 an ultra high vacuum device; 14 an exhauster; 15 an X-ray exciting mechanism; 16–21 gate valves; 22 an exhauster; 23 a semiconductor detector; 24 a vacuum container; 25 a liquid nitrogen dura; and 41 a soft X-ray transmitting window.

The following is an explanation of a case where the X-ray measuring device is mounted through the gate valve 16 in such a state that the ultra high vacuum device 13 produces an ultra high vacuum in the thus constructed apparatus. To start with, an X-ray spectrum/detection system 100 is dismounted at the gate valve 18. Next, the gate valves 16, 17 are closed, whereas the gate valves 19, 20 are opened. Air spaces Ia, Ib partitioned by the gate valve on both sides of the soft X-ray transmitting window 41 are simultaneously vacuum-exhausted by the exhauster 22 so as not to apply a differential pressure on the soft X-ray transmitting window 41. It is possible to exert almost no differential pressure by increasing an exhaust velocity as the vacuum goes well while reducing the initial exhaust velocity. Then, baking takes place about the air space Ia defined by the soft X-ray transmitting window 41 and the gate valves 16, 19. A water content contained in this air space is thereby reduced. In this instance, the same effects as those of the examples 1 and 2 are obtained because of the employment of the soft X-ray transmitting window 41 according to the present invention.

After finishing the baking process, the X-ray spectrum/detection system 100 is mounted through the gate valve 18. The gate valves 19, 20 are closed, whereas the gate valve 21 is opened. An air space defined by the gate valves 17, 18, 21 is sufficiently exhausted by the exhauster 22. Then, the gate valve 21 is closed, whereas the gate valves 17, 20, 16, 18 are opened. In this state, the high vacuum area on the side of the X-ray spectrum/detection system 100 is separated from the ultra high vacuum area on the side of the ultra high vacuum device by the soft X-ray transmitting window 41. The water content remaining in the vacuum on the side of the X-ray spectrum/detection system 100 does not contaminate the vacuum on the side of the ultra high vacuum device. Besides, the soft X-ray transmitting window 41 can be reduced to as thin as approximately 100 nm by exhausting with a valve manipulation so as not to apply the differential pressure as described above. The soft X-rays can be efficiently measured. It is therefore possible to measure the soft X-rays on the order of 1 kev or under that are radiated from light elements. Note that the procedures of opening and closing the gate valves 16–21 are not limited to the above-mentioned.

Example 4

Figure 4:
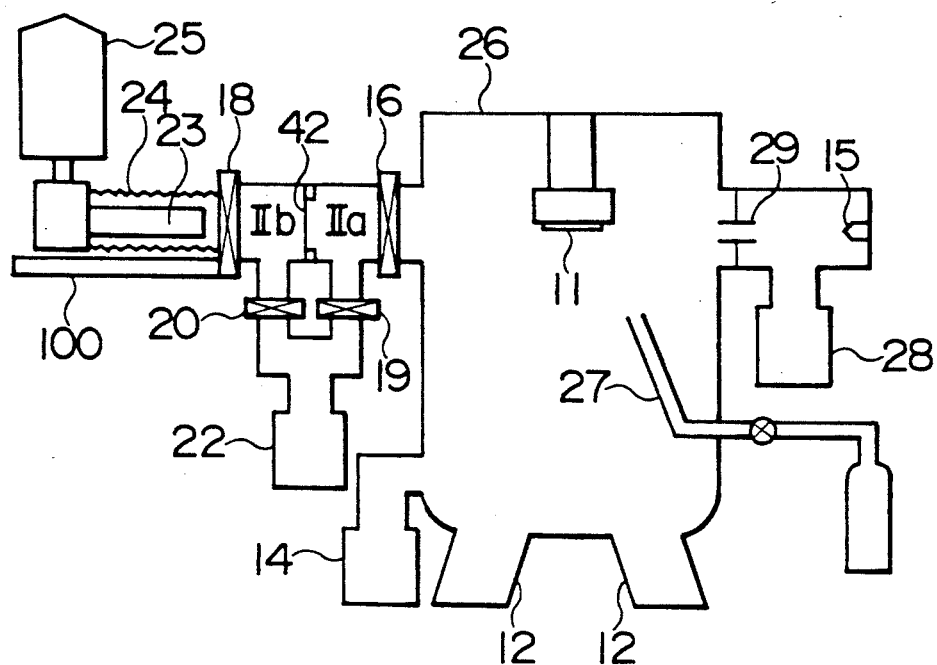
FIG. 4 is a block diagram in section showing one example where the soft X-ray transmitting window of this invention is applied to a high vacuum processor mounted with the X-ray measuring device.

FIG. 4 is a block diagram in section showing one other example where the soft X-ray transmitting window of this invention is applied. The X-ray measuring device is mounted on the high vacuum processor for forming an oxide thin film into which an oxidative gas is introduced.

Figure 5:
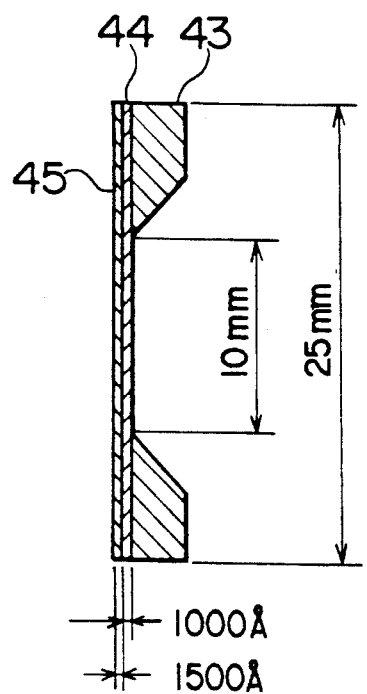
FIG. 5 is a sectional view showing a soft X-ray transmitting thin film member defined as a component of this invention.

Herein, the same components as those in FIG. 3 are marked with the like symbols. Referring to FIG. 4, the numeral 26 represents a high vacuum device; 27 an oxidative gas introducing mechanism; 28 an exhauster; 29 a differential exhaust orifice; and 42 a soft X-ray transmitting window. Further, FIG. 5 is a sectional view illustrating a soft X-ray transmitting thin film member used for the soft X-ray transmitting window 42. A support substance 43 is composed of silicon. A soft X-ray transmitting thin film 44 is composed of a silicon nitride thin film. A light shielding film 45 is composed of an aluminum film and serves to shield electromagnetic waves ranging from ultraviolet rays to far-infrared rays. Herein, silicon of the support substance 43 is joined via gallium 3 to the stainless steel (SUS304) of the support member including an opening.

Further, a mixture of gas atomized oxygen of an oxygen gas, oxygen and ozone is preferably employed as an oxidative gas.

The following is a description of a case where the X-ray measuring device is mounted through the gate valve 16 in such a state that the high vacuum is produced by the ultra high vacuum device 26 in the thus constructed apparatus. To start with, the gate valves 16, 18 are closed, whereas the gate valves 19, 20 are opened. Air spaces IIa, IIb partitioned by the gate valve on both sides of the soft X-ray transmitting window 42 are simultaneously vacuum-exhausted by the exhauster 22 so as not to apply a differential pressure on the soft X-ray transmitting window 42. It is possible to exert almost no differential pressure by increasing an exhaust velocity as the degree of vacuum is enhanced while reducing the initial exhaust velocity. Then, the gate valve 19 is closed, whereas the gate valves 16, 18 are opened. In this state, the high vacuum area on the side of the X-ray spectrum/detection system 100 is separated from the vacuum area on the side of the high vacuum device by the soft X-ray transmitting window 42. Therefore, the oxidative gas does not exert an influence on the X-ray spectrum/detection system 100 even when forming an oxide thin film by introducing the oxidative gas on the order of $10^{-4}$ Torr.

Besides, the soft X-ray transmitting thin film 44 of the soft X-ray transmitting window 42 can be reduced to as thin as approximately 100 nm by exhausting with a valve manipulation so as not to apply the differential pressure as described above. The soft X-rays can be efficiently measured. It is therefore possible to measure the soft X-rays on the order of 1 kev or under that are radiated from light elements. Further, the aluminum film 45 is deposited up to 100~200 nm on the soft X-ray transmitting thin film 44 by the ionized cluster beam evaporation method, etc.. It is thus feasible to shield the electromagnetic waves ranging from ultraviolet rays to far-infrared rays that come from the sample manufacturing mechanism and substrate heating when forming the oxide thin film. Further, this aluminum film transmits well the soft X-rays on the order of 1 keV or under. It is therefore possible to measure the soft X-rays radiated from the light elements. Besides, the aluminum film 45 is set on the side of the X-ray spectrum/detection system 100, while the silicon nitride thin film 44 is set on the side of the high vacuum device. With this arrangement, oxidation of the aluminum film 45 by the oxidative gas can be prevented. In addition, the nitride film such as a silicon nitride thin film or the like is not intensively corroded by the oxidative gas.

Note that the procedures of opening and closing the gate valves 16, 18~20 are not limited to the above-mentioned.

Further, the example 4 has dealt with the case where the oxide thin film is formed by introducing the oxidative gas. The example 4 is not, however, limited to this case. For instance, the same effects can be exhibited in a case where a III-V group compound thin film is formed by use of an organic metal gas, etc.. The high vacuum area on the side of the X-ray spectrum/detection system 100 is separated from the vacuum area on the side of the high vacuum device by the soft X-ray transmitting window 42. Therefore, the aluminum film is not corroded by the organic metal gas.

Example 5

Figure 6:
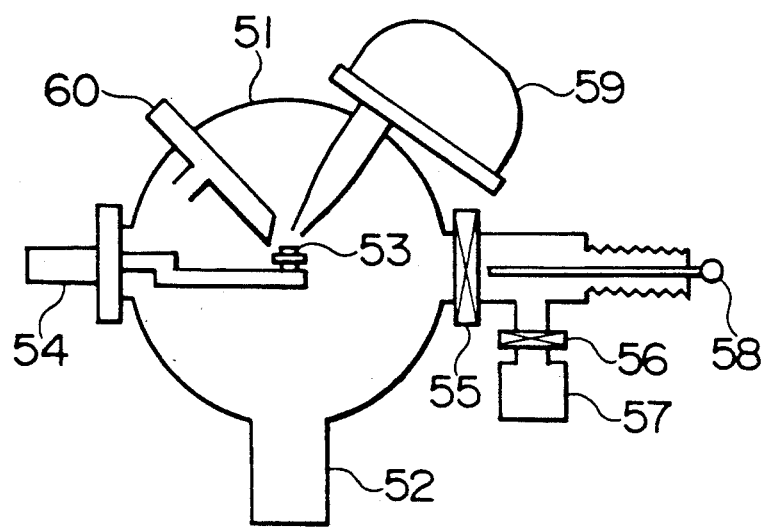
FIG. 6 is a block diagram in section showing one example where the soft X-ray transmitting window of this invention is applied to an X-ray source of an X-ray photoelectron spectrometric device.
Figure 7:
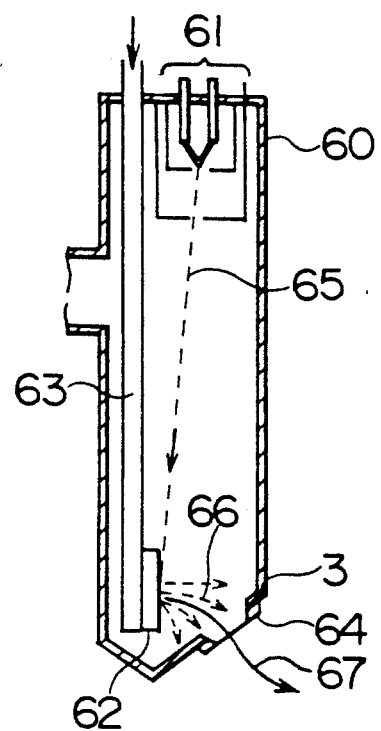
FIG. 7 is a sectional view fully illustrating the X-ray source to which the soft X-ray transmitting window of this invention is applied.

FIG. 6 is a block diagram in section showing one example where the soft X-ray transmitting window of this invention is applied to an X-ray source of an X-ray photoelectron spectrometric device. FIG. 7 is a sectional view illustrating details of the X-ray source. Referring to FIGS. 6 and 7, the numeral 51 designates an ultra high vacuum tank; 52 an exhauster; 53 a sample; 54 a manipulator; 55, 56 gate valves; 57 an exhauster; 58 a sample introducing mechanism; 59 an energy analyzer; 60 an X-ray source; 61 an electron ray source; 62 a target; 63 a cooling mechanism; 64 a soft X-ray transmitting window; 65 an electron ray; 66 scattered electrons; and 67 an X-ray.

The X-ray photoelectron spectrometry is based on a surface analyzing method and therefore requires an ultra high vacuum on the order of $10^{-8}$ Torr ($1.33 \times 10^{-6}$ Pa) or larger. In the thus constructed apparatus, the ultra high vacuum tank 51 undergoes baking while being exhausted by the exhauster 57 such as a turbo molecular pump or the like in a state where the gate valves 55, 56 are opened. Gallium 3 is fused when baked, and hence the same effects as those in the examples 1 and 2 are obtainable. After finishing the backing process, the gate valve 55 is closed, and the ultra high vacuum is attained by the exhauster 52. The sample 53 is introduced by use of the sample introducing mechanism 58. The sample irradiated with the X-rays from the X-ray source 60 generates photoelectrons. The photoelectrons are analyzed by the energy analyzer 59.

In the X-ray source 60, the target 62 of graphite or the like is irradiated with the electron ray 65 accelerated up to 500 eV–5 keV from the electron ray source 61. At this time, the target 62 is excited to emit the X-ray 67. The soft X-ray transmitting window 64 transmits this X-ray 67 which in turn falls on the sample 53. The soft X-ray transmitting thin film of the soft X-ray transmitting window 64 can be reduced as thin as approximately 100 nm because of the structure with no application of differential pressure. It is therefore possible to employ a carbon characteristic X-ray of the soft X-ray area as an X-ray source. Further, the electrons 66 scattered from the target are not allowed to penetrate the soft X-ray transmitting thin film and do not therefore strike on the sample 53. It is therefore feasible to obtain a sufficient intensity even when the characteristic X-ray of the soft X-ray area is used as an X-ray source without being limited to the carbon. Noises due to the scattered electrons 66 can be also reduced.

In the example 5 discussed above, there is shown an example where the soft X-ray transmitting window of this invention is employed as an X-ray source of the X-ray photoelectron spectrometric device. The invention is not limited to this example. As a matter of course, the same effects can be exhibited by using the soft X-ray transmitting window according to the present invention for other X-ray sources based on the electron ray excitation.

Example 6

Figure 8:
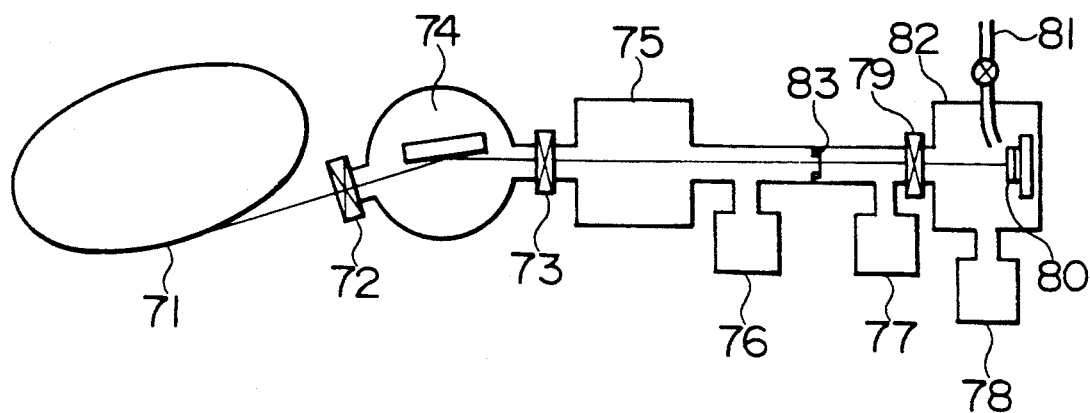
FIG. 8 is a block diagram in section showing one example where the soft X-ray transmitting window of this invention is applied to a soft X-ray photochemical reaction processor.

FIG. 8 is a block diagram in section showing one example where the soft X-ray transmitting window of this invention is applied to a soft X-ray photochemical reaction processor. The numeral 71 denotes a synchrotron radiation beam device; 72, 73 high-speed cut-off valves; 74 a mirror; 75 a spectroscope; 76–78 exhausters; 79 a gate valve; 80 a sample; 81 a gas introducing mechanism; 82 a vacuum tank; and 83 a soft X-ray transmitting window.

The synchrotron radiation beam device and the soft X-ray beam line require an ultra high vacuum on the order of $10^{-7}$ Torr ($1.33 \times 10^{-5}$ Pa) or larger. Baking is effected while being exhausted by the exhausters 76, 77. Gallium 3 is fused when baked, and hence the same effects as those in the examples 1 and 2 are obtainable. After finishing the baking process, the gate valve 79 is opened, thus making a connection under vacuum to the vacuum tank 82 into which the gas is introduced by the gas introducing mechanism 81. In this case, the vacuums are separated by the soft X-ray transmitting window 83. The introduced gas does not therefore flow to the synchrotron radiation beam device.

The soft X-ray transmitting thin film of the soft X-ray transmitting window 83 can be reduced as thin as approximately 100 nm because of the structure with no application of differential pressure on the soft X-ray transmitting window 83. It is possible to efficiently transmit the X-ray of the soft X-ray area. Therefore, a reaction speed of the introduced gas increases. A throughput of the sample 80 manufactured is improved. Further, the differential pressure can be kept in a degree-of-vacuum range from $10^{-10}$ Torr to $10^{-3}$ Torr. The conventional differential exhaust can be simplified. This leads to improvements of reliability and maintenance property as well; and the site can be saved.

Example 7

Figure 9:
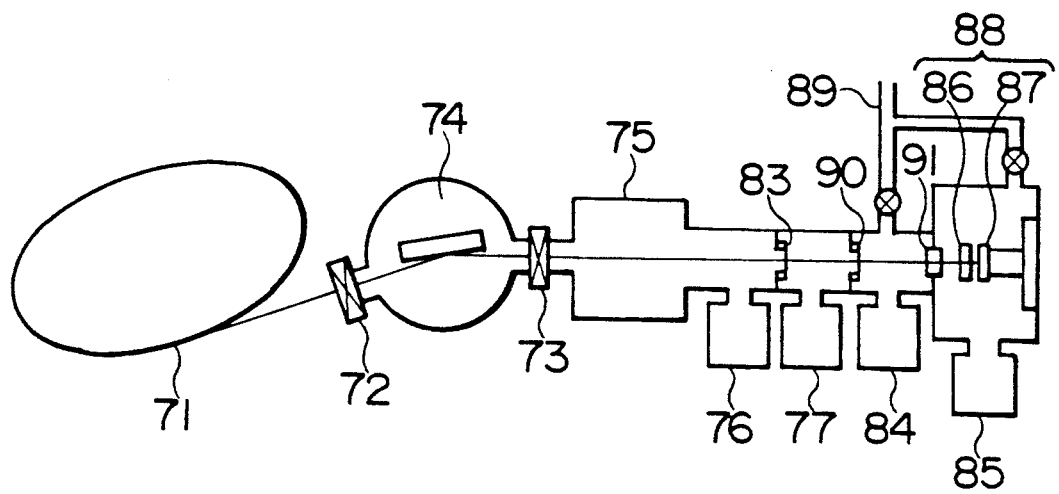
FIG. 9 is a block diagram showing one example where the soft X-ray transmitting window of this invention is applied to an X-ray lithography device.

FIG. 9 is a block diagram in section showing one example where the soft X-ray transmitting window of this invention is applied to an X-ray lithography device. The numerals 84, 85 represent exhausters; 86 an X-ray mask; 87 a sample; 88 an X-ray stepper; 89 a helium gas introducing mechanism; 90 a soft X-ray transmitting window; and 91 an X-ray transmitting window which is composed of beryllium or the like but does not transmit the visible ray. Note that the numerals 71–77 and 83 indicates the same components as those in FIG. 8.

The synchrotron radiation beam device and the soft X-ray beam line require an ultra high vacuum. Baking is effected while being exhausted by the exhausters 76, 77. Gallium 3 is fused when baked, and hence the same effects as those in the examples 1 and 2 are obtainable. The soft X-ray transmitting thin film of the soft X-ray transmitting window 83 can be reduced to as thin as approximately 100 nm because of the structure with no application of differential pressure on the soft X-ray transmitting window 83. It is possible to efficiently transmit the X-ray of the soft X-ray area. Further, the differential pressure can be kept in a degree-of-vacuum range from $10^{-10}$ Torr to $10^{-3}$ Torr. The conventional differential exhaust can be simplified. This leads to improvements of reliability and maintenance property as well; and the site can be saved.

Moreover, the differential pressure can be kept in the degree-of-vacuum range from $10^{-3}$ Torr to $10^{-1}$ Torr by using soft X-ray transmitting window 90 including the soft X-ray transmitting thin film having a larger thickness than that of the soft X-ray transmitting thin film of the soft X-ray transmitting window 83. Eventually, the vacuum state on the order of several Torr can be attained by use of the X-ray transmitting window 91 which is composed of beryllium or the like but does not transmit the visible ray. The X-ray stepper 88 can be thereby operated in the vacuum on the order of several Torr. The heat caused by the radiation beam can be diffused by using helium. Hence, the X-ray mask 86 does not thermally distort. Further, an intensity of the X-ray used for lithography is not substantially attenuated in the soft X-ray transmitting windows 83 and 90. Highly efficient exposure can be therefore practicable, and the throughput is also ameliorated.

Note that the same effects as those in the respective examples discussed above can be acquired even by use of an alloy containing gallium in place of gallium employed in the above-described examples. There will be herein explained a manufacturing method and operation in the case of the use of an alloy consisting of 75.5 weight % gallium as a substitute for gallium 3 in the example 1 and 24.5 weight % indium (herein referred to as a Ga75.5-In alloy). This Ga75.5-In alloy has a melting point of 15.7° C. The Ga75.5-In alloy which has been once fused exists in the as-liquefied state due to a supercooling phenomenon even when the temperature reaches the melting point or under, e.g., 10° C.

The Ga75.5-In alloy 3 is coated on the support member 2, thus joining the soft X-ray transmitting thin film member 1. The above-mentioned alloy is a liquid, and therefore the support member can be joined without being heated at room temperature in an ordinary laboratory. The vacuum chamber undergoes baking normally at 150° C. The Ga75.5-In alloy 3 assumes a liquid state during the baking process. Hence, there is no possibility in which the stress is applied on the soft X-ray transmitting thin film 32 due to a difference in the thermal expansion coefficient between the soft X-ray transmitting thin film member 1 and the support member 2, with the result that the thin film 32 is damaged. Further, the above-mentioned alloy is not solidified in the as-liquefied state in an installation location of ordinary experimental equipment. Therefore, stress due to variations in volume of the alloy that are caused during the solidification does not act on the soft X-ray transmitting thin film.

Figure 21:
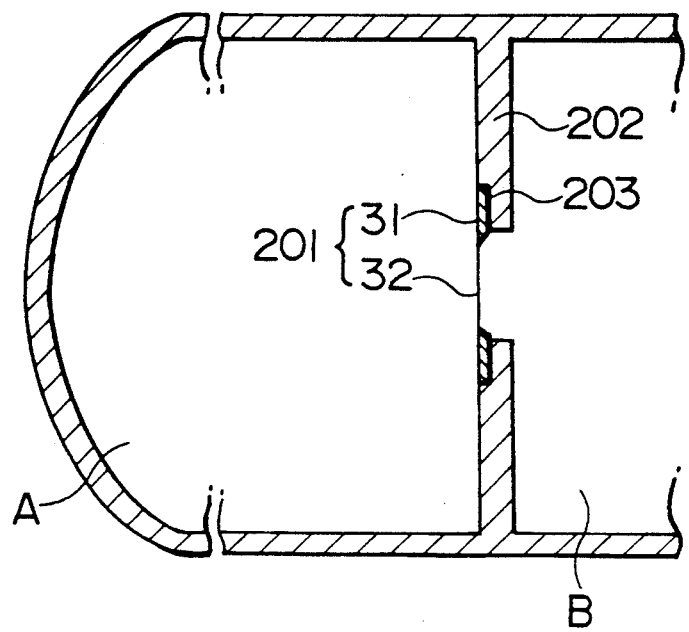
FIG. 21 is a sectional view illustrating a soft X-ray transmitting window in other example of this invention.

Further, the Ga75.5-In alloy has a viscosity and a surface tension. The soft X-ray transmitting thin film member 1 as illustrated in, e.g., FIG. 21 is joined to ICF152 flange of stainless steel (SUS304) by use of the Ga75.5-In alloy. The alloy does not flow out even when baked at 150° C., and the soft X-ray transmitting thin film member 1 is not peeled off. The vacuum of the ultra high vacuum area can be separated from the vacuum of the pressure reduction area A. Besides, the Ga75.5-In alloy has a higher viscosity than gallium and is well conformed to the stainless steel (SUS304). In addition, a vapor pressure of gallium or indium is $10^{-10}$ Torr or under at 150° C. The ultra high vacuum is not therefore contaminated during the baking process required for reaching the ultra high vacuum.

Figure 25:
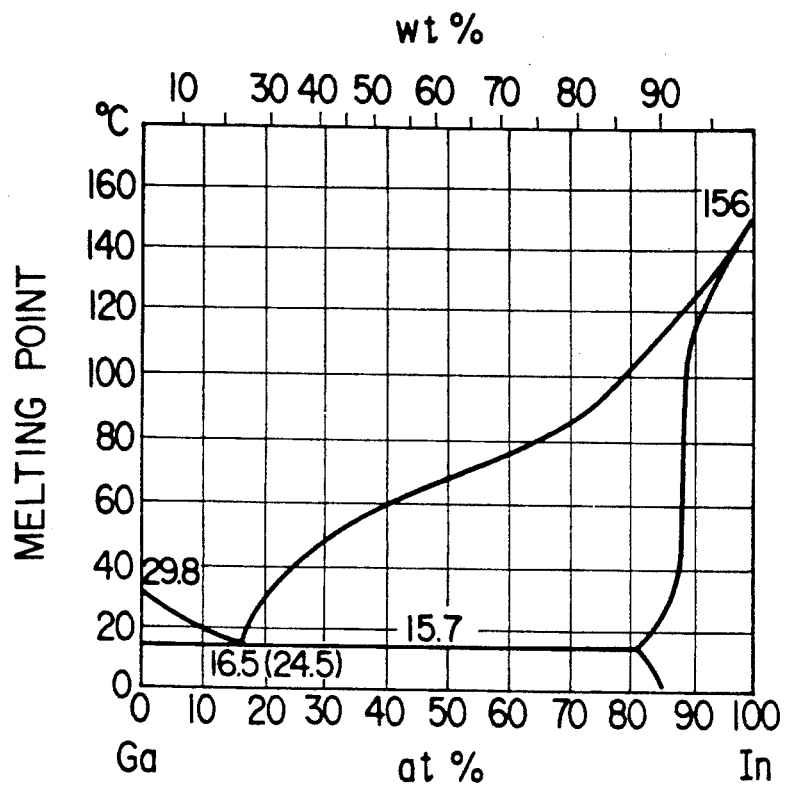
FIG. 25 is a state diagram showing a gallium-indium alloy.
Figure 26:
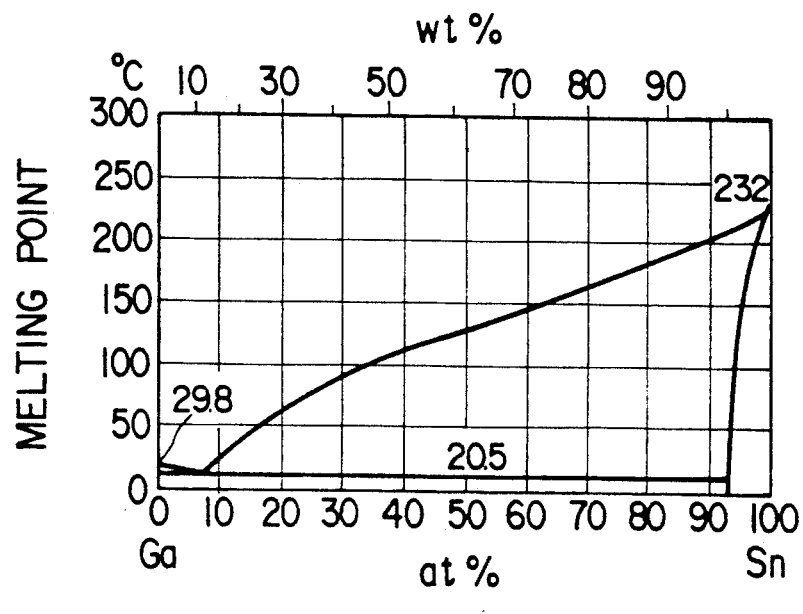
FIG. 26 is a state diagram showing a gallium-tin alloy.

In the discussion given above, there has been stated the case of employing the Ga75.5-In alloy having the minimum melting point of 15.7° C. as an alloy containing gallium. The alloy is not, however, limited to this plastic alloy. As known from state diagrams of, e.g., FIGS. 25 and 26, in gallium-indium alloys, an alloy having an indium weight percentage smaller than about 30% exhibits a melting point of 15.7°–29.8° C. Further, in gallium-tin alloys, an alloy having a tin weight percentage smaller than about 15% exhibits a melting point of 20.5°–29.8° C. lower than 29.8° C., i.e., the melting point of gallium. The alloy is fused in the container when baked. No stress is applied on the soft X-ray transmitting thin film due to a difference in the thermal expansion coefficient between the soft X-ray transmitting thin film member and the support member. Therefore, a thickness of the soft X-ray transmitting thin film can be reduced as much as possible. It is feasible to efficiently transmit the X-ray of the soft X-ray area. Besides, the gallium-indium alloy and the gallium-tin alloy exhibit the viscosity and the surface tension when fused. It is therefore feasible to separate the vacuum of the pressure reduction area from the vacuum of the ultra high vacuum area. Further, the gallium-indium alloy and the gallium-tin alloy have a low vapor pressure at a baking temperature. These alloys do not contaminate the ultra high vacuum during the baking process. Baking necessary for reaching the ultra high vacuum is therefore performable.

Example 8

Figure 10:
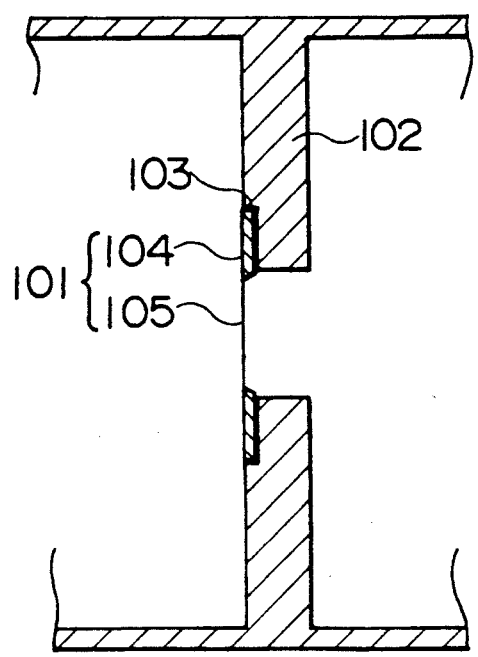
FIG. 10 is a sectional view illustrating an infrared ray transmitting window in other example of this invention.

FIG. 10 is a sectional view illustrating an infrared ray transmitting window in other example of the present invention. Referring to FIG. 10, the numeral 101 designates an infrared ray transmitting window construction member; 102 a support member for supporting the infrared ray transmitting window constructive member; and 103 an alloy consisting of 75.5 weight % gallium and 24.5 weight % indium (Ga75.5-In alloy). The support member 102 including an opening is composed of a vacuum structure material such as, e.g., stainless steel having a low thermal conductivity.

Figure 11:
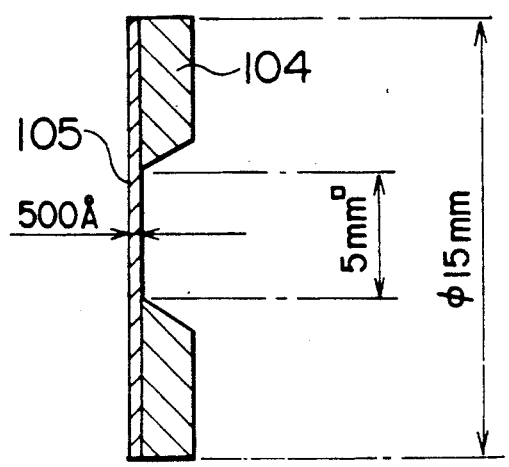
FIG. 11 is a sectional view showing one example of an infrared ray transmitting window constructive member defined as a component of this invention.

FIG. 11 is a sectional view illustrating a structure of the infrared ray transmitting constructive member 101. Referring to FIG. 11, the numeral 104 represents a support substance; and 105 an infrared ray transmitting thin film. For instance, a diameter of the support substance is 15 mm. A transmitting part has a square of 5 mm. The infrared ray transmitting thin film is 50 nm in thickness. Normally, the support substance 104 involves the use of silicon. A silicon nitride thin film having an extremely small thickness is employed for the infrared ray transmitting thin film 105. Formed on the silicon support substance 104 is the silicon nitride thin film 105 of a composition having substantially the same thermal expansion coefficient as that of silicon by the chemical vapor deposition (CVD) method. The silicon support substance 104 is removed by etching with an alkalic solution such as a potassium hydroxide (KOH) solution, thus forming the transmitting part. The support substance 104 and the infrared ray transmitting thin film 105 are not, however, limited to silicon and silicon nitride. The infrared ray transmitting thin film 105 may involve the use of, e.g., a diamond-like carbon thin film. Further, the etching method is not confined to the above-mentioned. For example, dry etching may be employed.

Next, a method of manufacturing the infrared ray transmitting window and the operation will be explained. The Ga75.5-In alloy 103 is coated on the support member 102, thus joining the infrared ray transmitting window constructive member 101. The Ga75.5-In alloy has a melting point of 15.7° C. The above-mentioned alloy which has been once fused exists in the as-liquefied state due to the supercooling phenomenon even when the temperature becomes the melting point or under, e.g., 10° C. The above-mentioned alloy is a liquid, and therefore the support member can be joined without being heated at room temperature in an ordinary laboratory. Further, the alloy described above is not solidified in the as-liquefied state in the installation location of ordinary experimental equipment. Therefore, the stress due to variations in volume of the alloy that are caused during the solidification does not act on the infrared ray transmitting thin film. For this reason, a thickness of the infrared ray transmitting thin film can be set to 50 nm or less. It is possible to acquire a transmittance of 10% or more with respect to the infrared ray having a wavelength that is absorbed by the silicon nitride thin film in an infrared ray area.

Example 9

Figure 12:
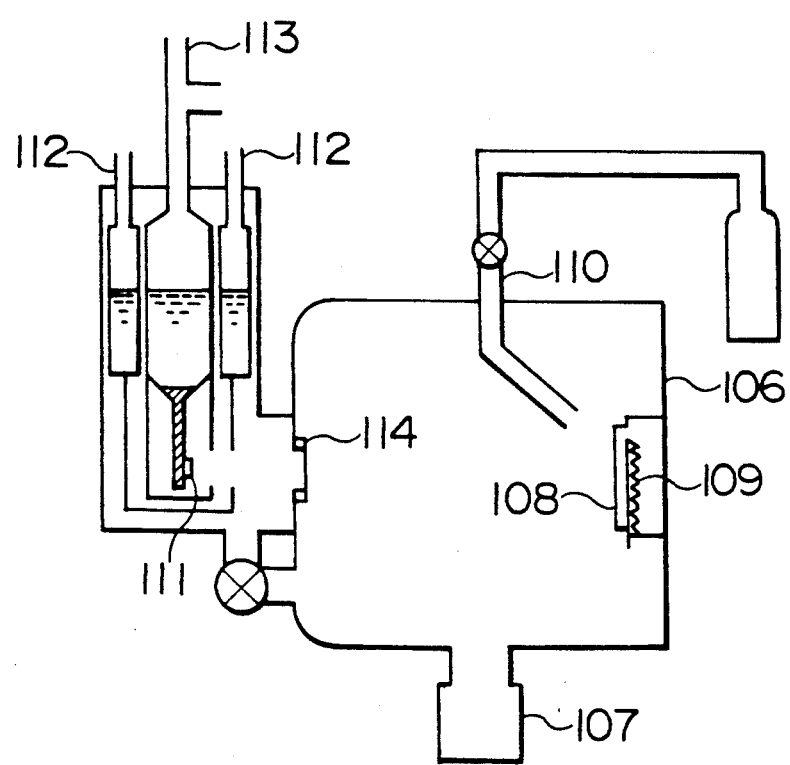
FIG. 12 is a block diagram in section showing one example where the infrared ray transmitting window of this invention is applied to a vacuum processor mounted with a radiation temperature measuring device.

FIG. 12 is a block diagram in section showing one example to which the infrared ray transmitting window of this invention is applied. A radiation temperature measuring device is mounted on the vacuum processor. Referring to FIG. 12, the numeral 106 indicates a vacuum tank; 107 an exhauster; 108 a sample; 109 a heating mechanism; 110 a gas introducing mechanism for manufacturing the sample; 111 an infrared ray detector; 112 a liquid nitride dura; 113 a liquid helium dura; and 114 an infrared ray transmitting window.

In the thus constructed apparatus, the vacuum tank 106 is evacuated by the exhauster 107. The infrared ray transmitting window 114 can be brought into a vacuum without applying a differential pressure thereon. The infrared ray transmitting thin film 105 of the infrared ray transmitting window 114 can therefore be reduced to as thin as approximately 50 nm. A limit of long wavelength is improved, and the infrared ray can be measured at a high efficiency. Even when the vicinity of the infrared ray transmitting window 114 is heated by radiation heat from the heating mechanism 109, there is no possibility in which the stress is applied on the infrared ray transmitting thin film 105 due to a difference in the thermal expansion coefficient between the infrared ray transmitting window constructive member 101 and the support member 102, with result that the thin film 105 is damaged. Besides, the above-mentioned alloy is not solidified in the as-liquefied state in the installation location of ordinary experimental equipment. The stress due to the variations in volume of the alloy that are caused during the solidification does not therefore act on the infrared ray transmitting thin film. Further, a vapor pressure of the silicon nitride thin film of the infrared ray transmitting thin film 105 is very low. The vapor pressures of gallium and indium are also low. Hence, when manufacturing the sample by employing a high purity gas, the constructive material of the infrared ray transmitting window 114, gallium and indium are not taken as impurities into the sample. Further, the silicon nitride thin film of the infrared ray transmitting thin film 105 is resistant against moisture and easy to deal with.

In the thus constructed apparatus, when using a germanium thick film and a silicon thick film each having a thickness of 10 μm and a diameter of 1 inch as the infrared ray transmitting window 114, the transmittance increases as compared with the case where an infrared ray transmitting window of silicon or germanium having a normal thickness of several mm.

Additionally, the gallium-indium alloy is a liquid. Hence, even when the vicinity of the infrared ray transmitting window 114 is heated by the radiation heat from the heating mechanism 109, there is no possibility wherein the stress acts on the silicon thick film or germanium thick film due to a difference in the thermal expansion coefficient between the support member 102 and the germanium thick film or silicon thick film having the thickness of 10 μm and the diameter of 1 inch, with the result that the thick film is damaged.

Example 10

Figure 13:
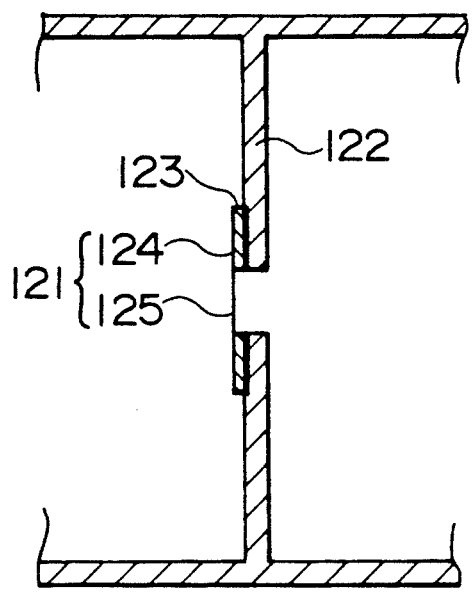
FIG. 13 is a sectional view illustrating a visible ray transmitting window in other example of this invention.

FIG. 13 is a sectional view illustrating a visible ray transmitting window in other example of this invention. The numeral 121 denotes a visible ray transmitting window constructive member; 122 a support member for supporting the visible ray transmitting window constructive member 121; and 123 an alloy consisting of 75.5 weight % gallium and 24.5 weight % indium (Ga75.5-In alloy). The support member 122 includes an opening and is constructed of a vacuum structure material such as stainless steel or an aluminum alloy.

Figure 14:
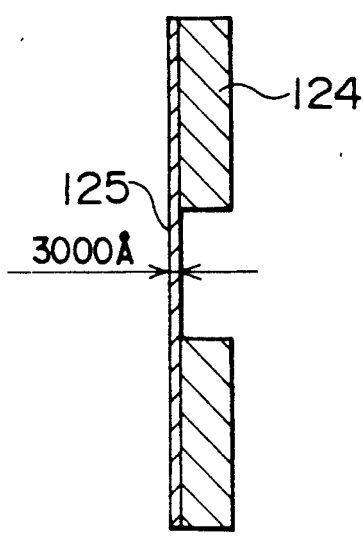
FIG. 14 is a sectional view showing one example of a visible ray transmitting window constructive member defined as a component of this invention.

FIG. 14 is a sectional view depicting a structure of this visible ray transmitting window constructive member. Referring to FIG. 14, the numeral 124 represents a support substance; and 125 a visible ray transmitting thin film. For instance, a diameter of the support substance is 40 mm. A transmitting part is defined by 10 mm × 30 mm. A thickness of the visible ray transmitting thin film is 300 nm. The support substance 124 involves the use of silicon. A silicon nitride thin film is employed for the visible ray transmitting thin film 125. The silicon nitride thin film 125 of a composition having substantially the same thermal expansion coefficients as silicon is formed on the support substance 124 by the chemical vapor deposition (CVD) method. The support substance 124 is selectively etched by an acid solution such as a hydrofluoric acid (HF) solution, etc.. The transmitting part is thus formed. The support substance 124 and the visible ray transmitting thin film 125 are not, however, limited to silicon and silicon nitride. Besides, the etching method is not limited to the above-mentioned. The dry etching method may be used.

Next, a method of manufacturing the visible ray transmitting window and the operation will be explained. The Ga75.5-In alloy 123 is coated on the support member 122, thus joining the visible ray transmitting window constructive member 121. The Ga75.5-In alloy has a melting point of 15.7° C. The above-mentioned alloy which has been once fused exists in the as-liquefied state due to the supercooling phenomenon even when the temperature becomes the melting point or under, e.g., 10° C. The above-mentioned alloy is a liquid, and therefore the support member can be joined without being heated at room temperature in an ordinary laboratory. Further, the alloy described above is not solidified in the as-liquefied state in the installation location of ordinary experimental equipment. Therefore, the stress due to variations in volume of the alloy that are caused during the solidification does not act on the visible ray transmitting thin film. For this reason, a thickness of the visible ray transmitting thin film can be set to approximately 100 nm. It is possible to reduce a scatter of light and an optical distortion in the silicon nitride thin film.

Example 11

Figure 15:
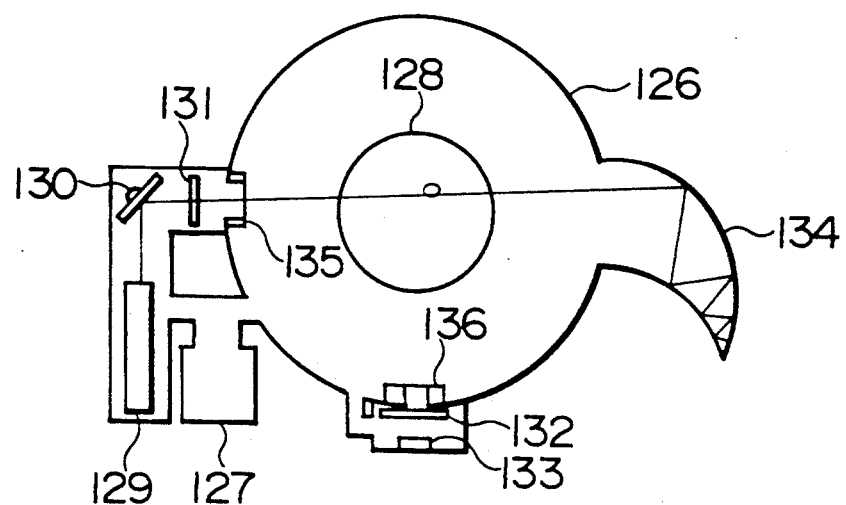
FIG. 15 is a top block diagram in section showing one example where the visible ray transmitting window of this invention is applied to the vacuum processor mounted with a fine-grain measuring device.

FIG. 15 is a top block diagram in section showing one example where the visible ray transmitting window of this invention is applied. A fine-grain measuring device is mounted on the vacuum processor. Referring to FIG. 15, the numeral 126 indicates a vacuum tank; 127 an exhauster; 128 a sample; 129 a laser light source; 130 a scanning mirror; 131, 132 optical elements; 133 a photo detector; 134 a light top; and 135, 136 visible ray transmitting windows.

In the thus constructed apparatus, the vacuum tank 126 is evacuated by the exhauster 127. The visible ray transmitting windows 135, 136 can be brought into a vacuum without applying a differential pressure thereon. The visible ray transmitting thin film 125 of each of the visible ray transmitting windows 135, 136 can be therefore reduced to as thin as approximately 100 nm. It is possible to reduce the scatter of light and the optical distortion in the silicon nitride thin film. Hence, there exists no possibility wherein the light is scattered in the visible ray transmitting thin film 125 of the visible ray transmitting window 135 to increase a detection background. Further, a variation on the plane of polarization due to the optical distortion in the visible ray transmitting thin film of each of the visible ray transmitting windows 135, 136 is very small. Consequently, the detection background does not increase. Hence, a lower limit of detection of the fine grains can be improved.

Example 12

Figure 16:
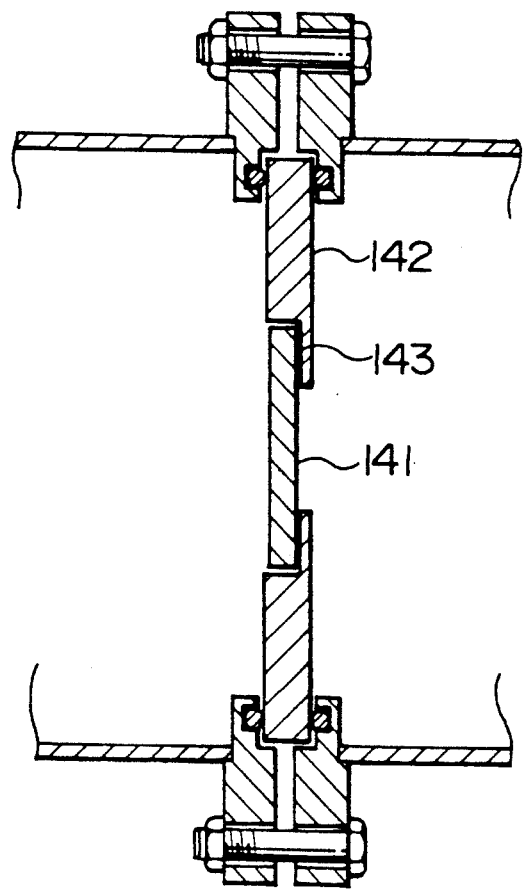
FIG. 16 is a sectional view illustrating the visible ray transmitting window in other example of this invention.

FIG. 16 is a sectional view illustrating a visible ray transmitting window in other example of this invention. The numeral 141 denotes a visible ray transmitting thick film composed of a quartz plate having a thickness of several mm; 142 a support member for supporting the visible ray transmitting thick film 141; and 143 an alloy consisting of 75.5 weight % gallium and 24.5 weight % indium (Ga75.5-In alloy). The support member 142 includes an opening and is constructed of a vacuum structure material such as stainless steel or an aluminum alloy.

Next, a method of manufacturing the visible ray transmitting window and the operation will be explained. The Ga75.5-In alloy 143 is coated on the support member 142, thus joining the visible ray transmitting thick film 141. The Ga75.5-In alloy has a melting point of 15.7° C. The above-mentioned alloy which has been once fused exists in the as-liquefied state due to the supercooling phenomenon even when the temperature becomes the melting point or under, e.g., 10° C. The above-mentioned alloy is a liquid, and therefore the support member can be joined without being heated at room temperature in an ordinary laboratory. Further, the alloy described above is not solidified in the as-liquefied state in the installation location of ordinary experimental equipment. Therefore, the stress due to variations in volume of the alloy that are caused during the solidifcation does not act on the visible ray transmitting thin film. For this reason, an index of double refraction can be made substantially zero, this index of double refraction being produced when depressing the visible ray transmitting thick film directly by an O-ring or fusing the visible ray transmitting thick film 141 to the support member 142. The optical distortion can be reduced.

Example 13

Figure 17:
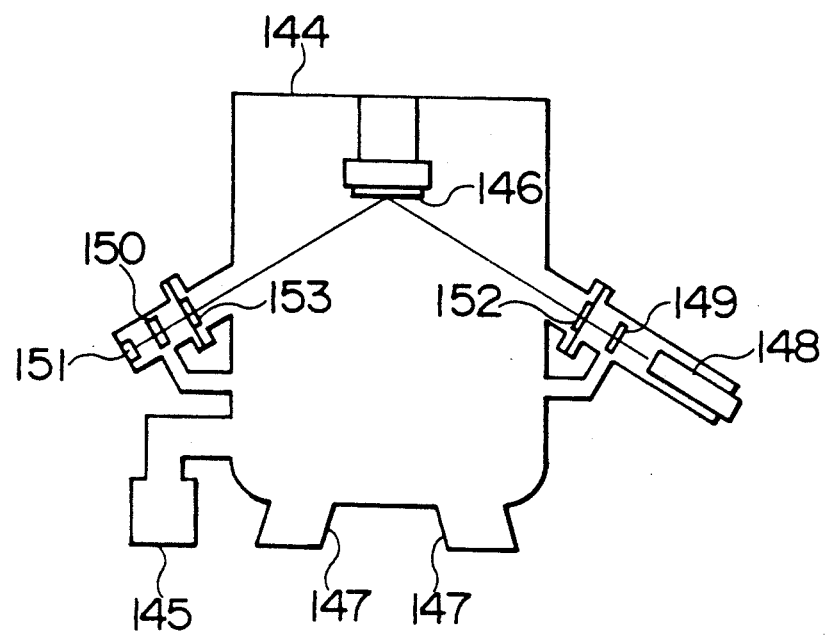
FIG. 17 is a block diagram in section showing one example where the visible ray transmitting window of this invention is applied to a high vacuum processor mounted with an ellipsometer.

FIG. 17 is a block diagram in section showing one example where the visible ray transmitting window of this invention is applied. An ellipsometer is mounted on the high vacuum processor. Referring to FIG. 17, the numeral 144 indicates a vacuum tank; 145 an exhauster; 146 a sample; 147 a sample manufacturing mechanism; 148 a laser light source; 149, 150 optical elements; 151 a phot detector; and 152, 153 visible ray transmitting windows.

In the thus constructed apparatus, the vacuum tank 144 is vacuumized by the exhauster 127. The visible ray transmitting windows 152, 153 can be brought into a vacuum without applying a differential pressure thereon. The visible ray transmitting thick film 141 of each of the visible ray transmitting windows 152, 153 does not therefore come off. As in the examples 12, the index of double refraction can be substantially made zero in accordance with this example, the index of double refraction being produced when depressing the visible ray transmitting thick film 141 directly by the O-ring or fusing the visible ray transmitting thick film 141 to the support member 142. The optical distortion can be reduced. It is therefore unnecessary to compensate the distortion caused by the visible ray transmitting thick film 141. A precise measurement is performable.

Example 14

Figure 18:
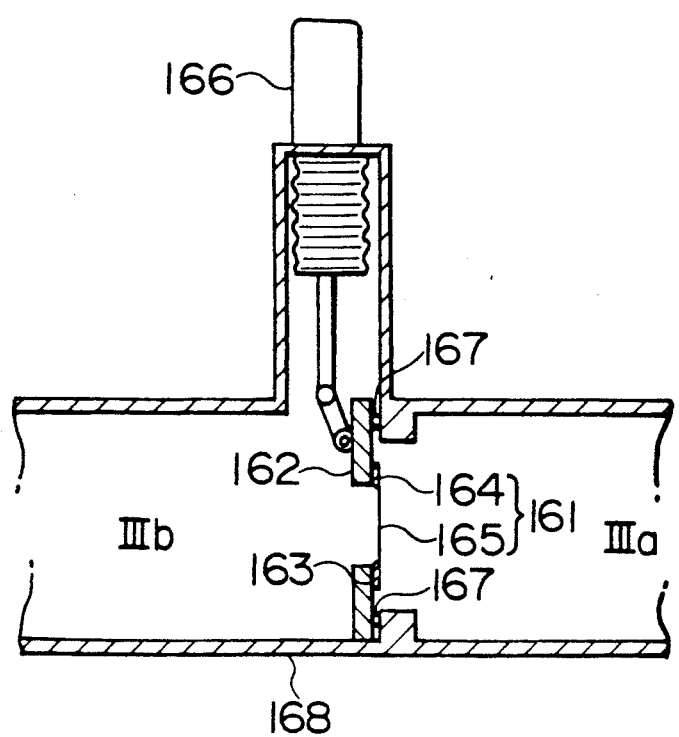
FIG. 18 is a sectional view illustrating a vacuum ultraviolet transmitting window in other example of this invention.

FIG. 18 is a sectional view illustrating a vacuum ultraviolet transmitting window in other example of this invention. The numeral 161 denotes a vacuum ultraviolet transmitting window constructive member; 162 a support member for supporting the vacuum ultraviolet transmitting window constructive member 161; 163 an alloy consisting of 75.5 weight % gallium and 24.5 weight % indium (Ga75.5-In alloy); 166 a straight line introducing mechanism; 167 a sealing material; and 168 a vacuum container. The support member 162 includes an opening and is constructed of a vacuum structure material such as stainless steel or an aluminum alloy.

Figure 19:
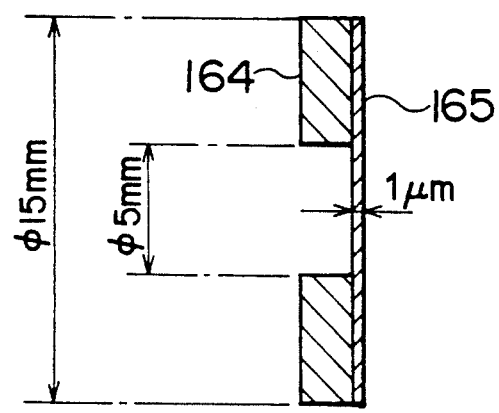
FIG. 19 is a sectional view showing a structure of a vacuum ultraviolet transmitting window constructive member.

FIG. 19 is a sectional view illustrating a structure of the vacuum ultraviolet transmitting window constructive member 162. Referring to FIG. 19, the numeral 164 represents a support substance; and 165 a vacuum ultraviolet transmitting thin film. For instance, a diameter of the support substance is 15 mm. A transmitting part has a diameter of 5 mm. A thickness of the vacuum ultraviolet transmitting thin film is 1 $\mu$m. The support substance 164 involves the use of silicon. A calcium fluoride film or a sapphire film is employed for the vacuum ultraviolet transmitting thin film 165.

Next, a method of manufacturing the vacuum ultraviolet transmitting window and the operation will be explained. The Ga75.5-In alloy 163 is coated on the support member 162, thus joining the vacuum ultraviolet transmitting window constructive member 161. The Ga75.5-In alloy has a melting point of 15.7° C. The above-mentioned alloy which has been once fused exists in the as-liquefied state due to the supercooling phenomenon even when the temperature becomes the melting point or under, e.g., 10° C. The above-mentioned alloy is a liquid, and therefore the support member can be joined without being heated at room temperature in an ordinary laboratory. Further, the alloy described above is not solidified in the as-liquefied state in the installation location of ordinary experimental equipment. Therefore, the stress due to variations in volume of the alloy that are caused during the solidification does not act on the vacuum ultraviolet transmitting thin film. Further, exhausting is effected so as not to apply the differential pressure on the vacuum ultraviolet transmitting thin film. Consequently, the support member 162 is raised by the straight line introducing mechanism 166. Air spaces IIIa, IIIb communicate with each other, in which state exhausting starts. After the air spaces IIIa, IIIb have been sufficiently exhausted, the support member 162 is lowered by the straight line introducing mechanism 166. Then, vacuum sealing is performed by use of the sealing material 167. The air spaces IIIa, IIIb can thereby be separated under vacuum. No differential pressure is exerted on the vacuum ultraviolet transmitting thin film by exhausting conducted in this way. Hence, a thickness of the vacuum ultraviolet transmitting thin film can be set to approximately 100 nm. A transmission limit wavelength can be further shortened.

Example 15

Figure 20:
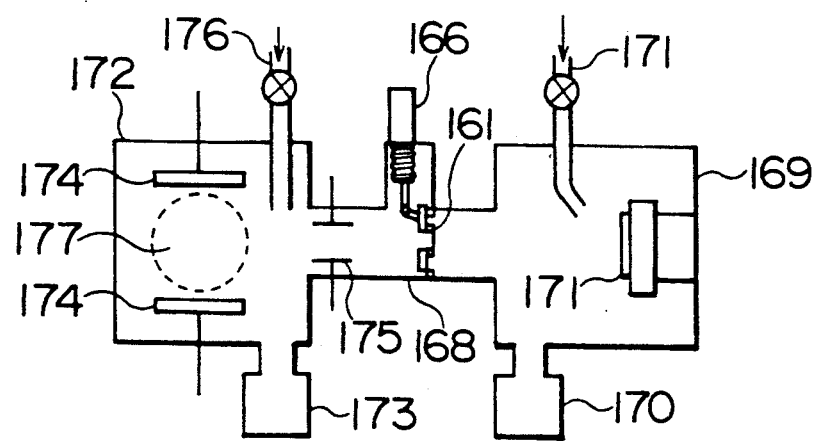
FIG. 20 is a block diagram in section showing one example where the vacuum ultraviolet transmitting window of this invention is applied to the photochemical reaction processor including a vacuum ultraviolet plasma light source.

FIG. 20 is a side block diagram showing one example where the vacuum ultraviolet transmitting window of this invention is applied to a photochemical reaction processor incorporating a vacuum ultraviolet plasma light source. Referring to FIG. 20, the numeral 169 designates a vacuum tank; 170 an exhauster; 171 a gas introducing mechanism for manufacturing a sample; 172 a vacuum tank; 173 an exhauster; 174 a plasma exciting mechanism; 175 a charged particle eliminating mechanism; 176 a gas introducing mechanism for generating the plasma; and 177 plasma. Herein, the vacuum tank 169 is connected to the vacuum tank 172 by employing the vacuum ultraviolet transmitting window in the example 14 shown in FIG. 18.

In the thus constructed apparatus, as in the example 14, evacuation is performed to apply no differential pressure. Thereafter, the vacuum of the vacuum tank 169 can be separated from that of the vacuum tank 172 by use of the vacuum ultraviolet transmitting window. The plasma generating gas is herein introduced by the gas introducing mechanism 176. The plasma is generated by the plasma exciting mechanism 174, e.g., by discharging or a laser. The vacuum ultraviolet transmitting window transmits a vacuum ultraviolet ray emitted from the plasma 177. The gas introduced by the gas introducing mechanism 171 is reacted, thus manufacturing the sample. This apparatus is constructed to perform evacuation so as not to apply the differential pressure. The vacuum ultraviolet transmitting thin film 165 of the ultraviolet transmitting window 161 can therefore be reduced to as thin as approximately 100 nm. The transmission limit wavelength can be further shortened. An intensity in the vicinity of the transmission limit wavelength is enhanced. A reactive speed also increases. A throughput of manufacturing the sample rises. Besides, a crystal growth of mercury cadmium tellurium is conducted for the sample 171; or the plasma 177 is caused by discharging of mercury. In such a case, mercury and an alloy containing mercury may be employed in place of the Ga75.5-In alloy 163. Namely, if no influence is exerted on the process even in a place where the vapor pressures of the metal and alloy employed for joining are high, the above-mentioned metal and alloy are usable.

Note that in the light transmission type vacuum separating window for taking out the light, the light transmitting window constructive member is joined to the support member, including the opening, for supporting the light transmitting window constructive member. The invention is not, however, limited to this example but may be applicable to a case where two substances having different thermal expansion coefficients are joined. As a matter of course, the arrangement can be made to apply no stress.

Example 16

FIG. 21 is a sectional view illustrating the soft X-ray transmitting window in another example of this invention. Referring to FIG. 21, the numeral 201 represents a soft X-ray transmitting window constructive member as shown in FIG. 24; 202 a support member, including an opening, for supporting the soft X-ray transmitting window constructive member. In the majority of cases, the support member 202 is composed of an ultra high vacuum structure material such as stainless steel and an aluminum alloy. The numeral 203 designates gallium. Further, the symbol A indicates a pressure reduction area in a vacuum chamber, and B represents an ultra high vacuum area.

Next, a method of manufacturing the soft X-ray transmitting window shown in FIG. 21 and the operation thereof will be explained. The support member 202 is, when heated up, coated with gallium 203. The soft X-ray transmitting window constructive member 201 is then joined. The vacuum chamber is baked normally at 150° C. The gallium 203 is liquefied when baked. Hence, there exists no possibility, wherein a stress is applied to the soft X-ray transmitting thin film 32 due to a difference in thermal expansion coefficient between the soft X-ray transmitting window constructive member 201 and the support member 202 for supporting the soft X-ray transmitting window constructive member, with the result that the film 32 is damaged. Further, a viscosity of gallium when liquefied is 1.4 mN·s/m$^2$ at 150° C. A surface tension thereof is 706 mN/m. For instance, this type of soft X-ray transmitting window constructive member 201 is joined to ICF152 flange of stainless steel (SUS304) by use of gallium. Even when baked at 150° C., gallium does not flow out, and this soft X-ray transmitting window constructive member 201 is not peeled off. The airtightness of the ultra high vacuum area B and the pressure reduction area A can be maintained. Further, a vapor pressure of gallium is $10^{-10}$ Torr or under at 150° C. Therefore, the ultra high vacuum is not contaminated during baking required for attaining the ultra high vacuum.

Example 17

Figure 22:
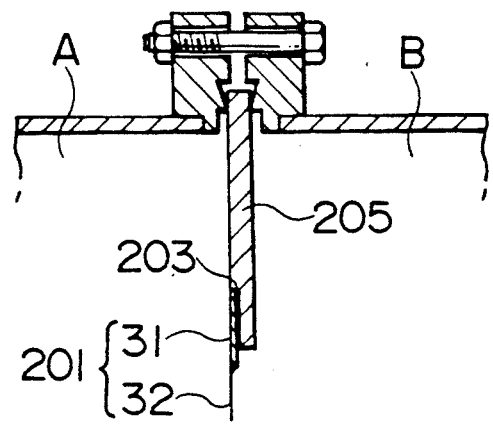
FIG. 22 is a sectional view illustrating the soft X-ray transmitting window in other example of this invention.

FIG. 22 is a sectional view illustrating the principal portion of the soft X-ray transmitting window in another example of this invention. Referring to FIG. 22, the numerals 201 and 203 indicate the same components as those in FIG. 1. The numeral 205 represents a support member, including an opening, for supporting the soft X-ray transmitting window constructive member. The support member composed of oxygen free copper or an aluminum alloy serves as a gasket.

In this type of soft X-ray transmitting window also, the same effects as those in the example 16 can be obtained.

Incidentally, the support member is formed with a receiving part for receiving the soft X-ray transmitting window constructive member so that the soft X-ray transmitting window constructive member 201 is not peeled off or slipped off. However, the soft X-ray transmitting window constructive member 201 may be lightly pressed by a presser bar.

Note that in the discussion given above, there is shown an example of joining the soft X-ray transmitting window constructive member 201 including the support substance composed of silicon and the soft X-ray transmitting film 32 composed of the silicon nitride film by use of gallium 203. However, the same effects are obtained even by joining a soft X-ray transmitting window constructive member including a support substance of oxygen free copper and composed of a beryllium thin film by use of gallium. Further, as a matter of course, the same effects are acquired even by joining a soft X-ray transmitting window constructive member composed of a thin beryllium foil by use of gallium.

Effected is such a treatment that gallium 203 is easy to wet and has a good adhesion to the joining parts of the support member 205 and the soft X-ray transmitting window constructive member 201. For instance, nickel is plated on the surface of the joining part of the support member 205. An airtightness may be thus enhanced by increasing the joining property.

Example 18

Figure 23:
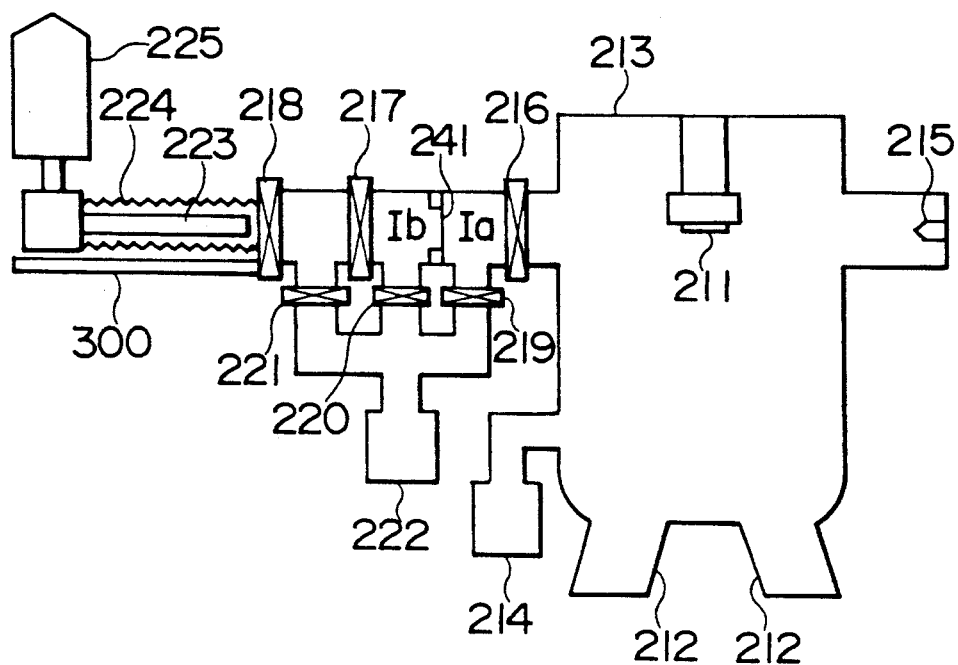
FIG. 23 is a view showing an example where the soft X-ray transmitting window of this invention is employed when mounting the X-ray measuring device on the ultra high vacuum processor.

FIG. 23 is a block diagram in section showing an example where the soft X-ray transmitting window of the present invention is employed for an ultra high vacuum processor when mounting an X-ray measuring device. Referring to FIG. 23, the numeral 211 denotes a sample; 212 a sample manufacturing mechanism; 213 an ultra high vacuum device; 214 an exhauster; 215 an X-ray exciting mechanism; 216–221 gate valves; 222 an exhauster; 223 a semiconductor detector; 224 a vacuum container; 225 a liquid nitrogen dura; and 241 a soft X-ray transmitting window.

It is considered that the X-ray measuring device is mounted through the gate valve 216 in such a state that the ultra high vacuum device 213 produces an ultra high vacuum in the thus constructed apparatus. To start with, an X-ray spectrum/detection system 300 is dismounted at the gate valve 218. Next, the gate valves 216, 217 are closed, whereas the gate valves 219, 220 are opened. Air spaces Ia, Ib partitioned by the gate valve on both sides of the soft X-ray transmitting window 241 are simultaneously vacuum-exhausted by the exhauster 222 so as not to apply a differential pressure on the soft X-ray transmitting window 241. Then, baking takes place about the air space Ia defined by the soft X-ray transmitting window 241 and the gate valves 216, 219. A water content contained in this air space is thereby reduced.

In this instance, the same effects as those of the examples 16 and 17 are obtained because of the employment of the soft X-ray transmitting window 241 according to the present invention. After finishing the baking process, the X-ray spectrum/detection system 300 is mounted through the gate valve 218. The gate valves 219, 220 are closed, whereas the gate valve 221 is opened. An air space defined by the gate valves 217, 218, 221 is sufficiently exhausted by the exhauster 222. Then, the gate valve 221 is closed, whereas the gate valves 217, 220, 216, 218 are opened. In this state, the high vacuum area on the side of the X-ray spectrum/detection system 300 is separated from the ultra high vacuum area on the side of the ultra high vacuum device by the soft X-ray transmitting window 241. The water content remaining in the vacuum on the side of the X-ray spectrum/detection system 300 does not contaminate the vacuum on the side of the ultra high vacuum device. Besides, the soft X-ray transmitting window 241 can be reduced to as thin as approximately 1000 Å with a valve manipulation so as not to apply the differential pressure as described above. The soft X-rays can be efficiently measured. It is therefore possible to measure the soft X-rays on the order of 1 keV or under that are emitted from light elements. By the way, the procedures of opening and closing the gate valves 216–221 are not limited to the above-mentioned.

Note that the same effects as those in the respective examples discussed above can be acquired even by use of an alloy containing gallium in place of gallium employed in the above-described examples 16 and 18. There will be herein explained a manufacturing method and operation in the case of using an alloy consisting of 75.5 weight % gallium as a substitute for gallium 203 in the example 16 shown in, e.g., FIG. 21 and 24.5 weight % indium. The alloy consisting of 75.5 weight % gallium and 24.5 weight % indium has a melting point of 15.7° C. The alloy which has been once liquefied exists in the as-liquefied state due to a supercooling phenomenon even when the temperature becomes the melting point or under, e.g., 10° C.

The alloy 203 consisting of 75.5 weight % gallium and 24.5 weight % indium is coated on the support member 202, thus joining the soft X-ray transmitting window constructive member 201. The above-mentioned alloy is a liquid, and therefore the support member 202 can be joined without being heated at room temperature in an ordinary laboratory. The vacuum chamber undergoes baking normally at 150° C. The alloy 203 consisting of 75.5 weight % gallium and 24.5 weight % indium assumes a liquid state during the baking process. Hence, there is no possibility in which the stress is applied on the soft X-ray transmitting film 32 due to a difference in the thermal expansion coefficient between the soft X-ray transmitting window constructive member 201 and the support member 202 for supporting the soft X-ray transmitting window constructive member, with the result that the film 32 is damaged. Further, the above-mentioned alloy is not solidified in the as-liquefied state in an installation location of ordinary experimental equipment. Therefore, the stress due to variations in volume of the alloy that are caused during the solidification does not act on the soft X-ray transmitting film.

Further, the alloy consisting of 75.5 weight % gallium and 24.5 weight % indium has a viscosity and a surface tension. The soft X-ray transmitting window constructive member 201 as illustrated in, e.g., FIG. 24 is joined to ICF152 flange of stainless steel (SUS304) by use of the alloy consisting of 75.5 weight % gallium and 24.5 weight % indium. The alloy consisting of 75.5 weight % gallium and 24.5 weight % indium does not flow out even when baked at 150° C., and the soft X-ray transmitting window constructive member 201 is not peeled off. The ultra high vacuum area B and the pressure reduction area A can be kept airtightly. The alloy consisting of 75.5 weight % gallium and 24.5 weight % indium has a higher viscosity than gallium and is well conformed to the stainless steel (SUS304). In addition, a vapor pressure of gallium or indium is $10^{-10}$ Torr or under at 150° C. The ultra high vacuum is not therefore contaminated during the baking process required for reaching the ultra high vacuum.

In the discussion given above, there has been stated the case of employing the alloy consisting of 75.5 weight % gallium and 24.5 weight % indium and having the minimum melting point of 15.7° C. as an alloy containing gallium. The alloy is not, however, limited to this. As known from state diagrams of, e.g., FIGS. 25 and 26, in gallium-indium alloys, an alloy having an indium weight percentage smaller than about 30% exhibits a melting point of 15.7°–29.8° C. Further, in gallium-tin alloys, an alloy having a tin weight percentage smaller than about 15% exhibits a melting point of 20.5°–29.8° C. lower than 29.8° C., i.e., the melting point of gallium. The alloy is liquefied when baked. No stress is applied on the soft X-ray transmitting film due to a difference in the thermal expansion coefficient between the soft X-ray transmitting window constructive member and the support member. Therefore, a thickness of the soft X-ray transmitting film can be reduced as much as possible. It is also possible to efficiently transmit the X-ray of the soft X-ray area. Besides, the gallium-indium alloy and the gallium-tin alloy exhibit the viscosity and the surface tension when liquefied. It is therefore feasible to keep the airtightness of the pressure reduction area and the ultra high vacuum area. Further, the alloys containing gallium, e.g., the gallium-indium alloy and the gallium-tin alloy have a low vapor pressure at a baking temperature. These alloys do not contaminate the ultra high vacuum during the baking process. Baking necessary for reaching the ultra high vacuum is therefore performable.

Incidentally, for reference, the discussion given above has dealt with the case where the soft X-ray transmitting window constructive member is joined to the support member, formed with the opening, for supporting the soft X-ray transmitting window constructive member in the soft X-ray transmitting window for taking out the soft X-rays. The arrangement is not, however, confined to this. As a matter of course, it is possible to exert no stress when applied to a case where two substances having different thermal expansion coefficients are joined.

As discussed above, according to the present invention, the vacuum areas are separated by the thin film. Based on this construction, the following effects are produced. The transmittance of light in the light transmission type vacuum separating window can be increased. Further, the distortion and scatter of light in the thin film can be reduced.

Besides, the vacuum areas are separated by the thin film member. Based on this construction, there are exhibited such effects that the transmittance of light in the light transmission type vacuum separating window can be enhanced; and further the distortion and scatter in the thin film member can be reduced.

Additionally, the thickness of the thin film is set to 1 $\mu$m or under. With this construction, the following effects are provided. The transmittance of light can be increased. Further, the material used for the thin film is not restricted.

Further, the thin film is provided with the heat resistant property against temperatures equal to or higher than 100° C. This arrangement yields effects wherein the thin film is usable even in a high temperature atmosphere enough to receiving the heat, and further baking needed for the ultra high vacuum can be performed.

Further, the wavelength area of light is constructed to become the X-ray range. Hence, there are produced such effects that the transmittance of the X-ray can be enhanced; and further the distortion and scatter of the X-ray in the thin film can be reduced.

In addition, the X-ray range is constructed to become the soft X-ray range. With this construction, there are exhibited effects wherein the transmittance of the soft X-ray can be increased; and further the distortion and scatter of the soft X-ray in the thin film can be decreased.

Further, the wavelength range of light is constructed to become the infrared ray range. Based on this construction, the following effects are provided. The transmittance of the infrared ray can be increased. Besides, the distortion and scatter of the infrared ray in the thin film can be reduced.

Further, the wavelength range of light is constructed to become the visible ray range. Based on this construction, the following effects are produced. The transmittance of the visible ray can be enhanced. Besides, the distortion and scatter of the visible ray can be decreased.

Further, the wavelength range of light is constructed to become the ultraviolet ray range. With this construction, there are produced effects wherein the transmittance of the ultraviolet ray can be increased, and further the distortion and scatter of the ultraviolet ray in the thin film can be decreased.

Additionally, the ultraviolet ray range is constructed to become the vacuum ultraviolet ray range. Based on this construction, the following effects are yielded. The transmittance of the vacuum ultraviolet ray can be enhanced. Besides, the distortion and scatter of the vacuum ultraviolet ray in the thin film can be reduced.

Further, the layer consisting of the metal or alloy that will turn out a liquid in the range of temperatures of the using environment is provided between the thin film and the support member. With this construction, the following effects are produced. It is possible to prevent the stress from acting on the thin film due to the volume-variation concomitant with the solidification. It is also feasible to prevent the stress from acting on the thin film due to the difference in the thermal expansion coefficient between the support member and the thin film during the baking process necessary for the ultra high vacuum. Hence, the thickness of the thin film can be set to 1 $\mu$m or less. Increased are the transmittances of light in the soft X-ray area and the infrared ray area in the light transmission type vacuum separating window. Further, the distortion and scatter in the thin film can be reduced.

Additionally, the layer consisting of the metal or alloy that will turn out a liquid in the range of temperatures of the using environment is provided between the thin film member and the support member. With this construction, the following effects are produced. It is possible to prevent the stress from acting on the thin film member due to the volume-variation concomitant with the solidification. It is also feasible to prevent the stress from acting on the thin film member due to the difference in the thermal expansion coefficient between the support member and the thin film member during the baking process necessary for the ultra high vacuum. Hence, the thickness of the thin film can be set to 1 μm or less. Increased are the transmittances of light in the soft X-ray area and the infrared ray area in the light transmission type vacuum separating window. Further, the distortion and scatter in the thin film can be reduced.

Further, the metal is gallium, while the alloy is the alloy containing gallium. Based on this construction, the following effects are obtained. During the baking process, they can be easily fused. No stress is applied on the light transmitting thin film due to the difference in the thermal expansion coefficient between the support member and the thin film or the thin film member. The thickness of the light transmitting thin film can be reduced as much as possible. It is possible to efficiently transmit the light such as the X-ray of the soft X-ray area and the infrared ray. Further, it is also feasible to remarkably reduce a rate at which the light undergoes the distortion in the thin film. Besides, an amount of scatter of light in the thin film can be decreased. In addition, gallium or the alloy containing gallium has the viscosity and the surface tension when fused. Hence, the vacuums can be separated. Further, gallium or the alloy containing gallium has the low vapor pressure even at the baking temperature but does not therefore contaminate the ultra high vacuum during baking. Baking needed for reaching the ultra high vacuum can be effected.

Additionally, an alloy containing gallium consists of either the gallium-indium alloy or the gallium-tin alloy. The alloy can be therefore easily fused during the baking process. There is no possibility wherein the stress is applied on the thin film due to the difference in the thermal expansion efficient between the support member and the thin film or the thin film member. The thickness of the thin film can be reduced as much as possible. It is therefore possible to efficiently transmit the light such as the X-ray of the soft X-ray area and the infrared ray. Further, it is also feasible to remarkably reduce a rate at which the light undergoes the distortion in the thin film. Besides, an amount of scatter of light in the thin film can be decreased. In addition, the gallium-indium alloy and the gallium-tin alloy have the viscosity and the surface tension when fused. Hence, the vacuums can be separated. Further, the gallium-indium alloy and the gallium-tin alloy have the low vapor pressure even at the baking temperature but do not therefore contaminate the ultra high vacuum during baking. Baking needed for reaching the ultra high vacuum can be effected.

Further, the gallium-indium alloy is an alloy composed of 75.5 weight % gallium and 24.5 weight % indium. Based on this construction, the following effects are produced. The melting point can be decreased down to 15.7° C. Therefore, the thickness of the light transmitting thin film can be further reduced. It is possible to transmit the light such as the X-ray of the soft X-ray area and the infrared ray at a much higher efficiency. Besides, the alloy is a liquid in the normally employed laboratory and can be therefore coated on the support member without being heated up. Besides, both gallium and indium have the low vapor pressure and do not contaminate the ultra high vacuum.

Further, at least any one of the plurality of vacuum areas is constructed to become the ultra high vacuum area on the order of $10^{-7}$ Torr or more. With this construction, the following effects are provided. The ultra high vacuum area and the vacuum area are separated. The transmittance of light can be further increased.

Additionally, the layer consisting of the metal or alloy that is a liquid in the range of temperatures of the using environment is provided between the thick film that transmits the light and the support member. Based on this construction, the following effects are obtained. There is no necessity for applying the stress associated with the fusion and sealing in the O-ring on the thick film. No double refraction is caused. Further, it is feasible to prevent the stress from acting on the thick film due to the difference in the thermal expansion coefficient between the support member and the thick film during baking needed for the ultra high vacuum.

Further, the layer consisting of the metal or alloy that is a liquid in the range of temperatures of the using environment is provided between the thick film member that transmits the light and the support member. Based on this construction, the following effects are obtained. There is no necessity for applying the stress associated with the fusion and sealing in the O-ring on the thick film member. No double refraction is caused. Further, it is feasible to prevent the stress from acting on the thick film member due to the difference in the thermal expansion coefficient between the support member and the thick film during baking needed for the ultra high vacuum.

Further, the metal is gallium, while the alloy is the alloy containing gallium. Based on this construction, the following effects are obtained. The stress associated with the fusion or sealing in the O-ring is not applied on the thick film or the thick film member. The double refraction does not therefore occur. Besides, gallium or the alloy containing gallium is easy to fuse during the baking process. Hence, there is no possibility in which the stress is applied on the light transmitting thick film due to the difference in the thermal expansion coefficient between the thick film or the thick film member and the support member. The light transmitting thick film is not damaged. In addition, gallium or the alloy containing gallium has the viscosity and the surface tension when fused. The vacuums can be therefore separated. Further, gallium or the alloy containing gallium has the low vapor pressure even at the baking temperature but does not therefore contaminate the ultra high vacuum during baking. It is feasible to effect baking needed for reaching the ultra high vacuum.

In addition, an alloy containing gallium consists of either the gallium-indium alloy or the gallium-tin alloy. The alloy can be therefore fused during the baking process. There is no possibility wherein the stress is applied on the thick film due to the difference in the thermal expansion efficient between the support member and the thick film or the thick film member. The distortion and scatter of light in the thick film can be reduced. Further, the gallium-indium alloy and the gallium-tin alloy have the viscosity and the surface tension when fused. Hence, the vacuums can be separated. Further, the gallium-indium alloy and the gallium-tin alloy have the low vapor pressure even at the baking temperature but do not therefore contaminate the ultra high vacuum during baking. Baking needed for reaching the ultra high vacuum can be effected.

Further, the gallium-indium alloy is an alloy composed of 75.5 weight % gallium and 24.5 weight % indium. Based on this construction, the following effects are produced. The melting point can be decreased down to 15.7° C. For instance, the above-mentioned alloy is not solidified in the as-liquefied state in the installation, location of ordinary experimental equipment. The stress due to variations in volume of the alloy that are caused during the solidification does not act on the thick film. Therefore, no double refraction occurs in the thick film or the thick film member. Besides, the alloy can be coated on the support member without being heated up. In addition, both gallium and indium are low of vapor pressure but do not contaminate the ultra high vacuum.

Further, at least any one of the plurality of vacuum areas is constructed to become the ultra high vacuum area on the order of $10^{-7}$ Torr or greater. Hence, the ultra high vacuum area and the vacuum area are separated. The transmittance of light is further enhanced.

Moreover, the soft X-ray transmitting window constructive member is joined to the support member, including the opening, for supporting the soft X-ray transmitting window constructive member by use of gallium or the alloy containing gallium. The following effects are therefore produced. It is possible to efficiently transmit the X-ray of the soft X-ray area and keep the airtightness of the pressure reduction area and the ultra high vacuum area. Further, baling needed for attaining the ultra high vacuum is performable.

Furthermore, the alloy containing gallium is an alloy consisting of 75.5 weight % gallium and 24.5 weight % indium. The melting point is therefore as low as 15.7° C. The thickness of the soft X-ray transmitting film can be further decreased. It is feasible to transmit the X-ray of the soft X-ray area at a much higher efficiency.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A light transmission type vacuum separating window comprising:
   a film transmitting a light wavelength range; and
   a supporting means comprising gallium for supporting said film, whereby partitioning into a plurality of vacuum areas is effected.

2. The light transmission type vacuum separating window according to claim 1, wherein a thickness of said film is 1 μm or under.

3. The light transmission type vacuum separating window according to claim 1, wherein said film exhibits a heat resistant property against temperatures of 100° C. or more.

4. The light transmission type vacuum separating window according to claim 1, wherein said light wavelength range is an X-ray range.

5. The light transmission type vacuum separating window according to claim 4, wherein said X-ray range is a soft X-ray range.

6. The light transmission type vacuum separating window according to claim 1, wherein said light wavelength range is an infrared ray range.

7. The light transmission type vacuum separating window according to claim 1, wherein said light wavelength range is a visible ray range.

8. The light transmission type vacuum separating window according to claim 1, wherein said light wavelength range is an ultraviolet ray range.

9. The light transmission type vacuum separating window according to claim 8, wherein said ultraviolet ray range is a vacuum ultraviolet ray range.

10. The light transmission type vacuum separating window according to claim 1, wherein said supporting means comprises a metal or an alloy that turns out a liquid in a range of temperatures of a using environment, provided between said film and a support member for supporting said film.

11. The light transmission type vacuum separating window according to claim 1, wherein said supporting means comprises an alloy containing gallium.

12. The light transmission type vacuum separating window according to claim 11, wherein said alloy containing gallium consists of either a gallium-indium alloy or a gallium-tin alloy.

13. The light transmission type vacuum separating window according to claim 12, wherein said gallium-indium alloy is an alloy containing 75.5 weight % gallium and 24.5 weight % indium.

14. The light transmission type vacuum separating window according to claim 1, wherein at least any one of said plurality of vacuum areas is an ultra high vacuum area on the order of $10^7$ torr or more.

15. The light transmission type vacuum separating window comprising:
   a film transmitting the light;
   a support member for supporting said film; and
   a metal or an alloy provided between said film and said support member and turning out a liquid in a range of temperatures of a using environment, whereby partitioning into a plurality of vacuum areas is effected through said film.

16. The light transmission type vacuum separating window according to claim 15, wherein said film is supported on a support substance.

17. The light transmission type vacuum separating window according to claim 15, wherein said metal is gallium, and said alloy is an alloy containing gallium.

18. The light transmission type vacuum separating window according to claim 17, wherein said alloy containing gallium consists of either a gallium-indium alloy or a gallium-tin alloy.

19. The light transmission type vacuum separating window according to claim 18, wherein said gallium-indium alloy is an alloy containing 75.5 weight % gallium and 24.5 weight % indium.

20. The light transmission type vacuum separating window according to claim 15, wherein at least any one of said plurality of vacuum areas is an ultra high vacuum area on the order of $10^{-7}$ Torr or more.

21. A soft X-ray transmitting window for taking out a soft X-ray with a pressure reduction area and an ultra high vacuum area partitioned in a vacuum chamber, said window comprising:
   a soft X-ray transmitting window constructive member; and
   a support member, including an opening, for supporting said soft X-ray transmitting window constructive member, wherein said soft X-ray transmitting window constructive member is joined to said support member by use of gallium or an alloy containing gallium.

22. The soft X-ray transmitting window according to claim 21, wherein said alloy containing gallium is an alloy consisting of 75.5 weight % gallium and 24.5 weight % indium.

23. A light transmission type vacuum separating window comprising:
   a film transmitting a light wavelength range;
   a support substance for supporting said film, whereby partitioning into a plurality of vacuum areas is effected; and
   wherein a metal or an alloy that turns out a liquid in a range of temperatures of a using environment is provided between said film and a support member for supporting said film.

24. The light transmission type vacuum separating window according to claim 23, wherein said metal is gallium, and said alloy is an alloy containing gallium.

25. The light transmission type vacuum separating window according to claim 24, wherein said alloy containing gallium consists of either a gallium-indium alloy or a gallium-tin alloy.

26. The light transmission type vacuum separating window according to claim 25, wherein said gallium-indium alloy is an alloy containing 75.5 weight % gallium and 24.5 weight % indium.

27. The light transmission type vacuum separating window according to claim 23, wherein at least any one of said plurality of vacuum areas is an ultra high vacuum area on the order of $10^7$ torr or more.

28. The light transmission type vacuum separating window according to claim 23, wherein a thickness of said film is 1 $\mu$m or under.

29. The light transmission type vacuum separating window according to claim 23, wherein said film exhibits a heat resistant property against temperatures of 100° C. or more.

30. The light transmission type vacuum separating window according to claim 23, wherein said light wavelength range is an X-ray range.

31. The light transmission type vacuum separating window according to claim 30, wherein said X-ray range is a soft X-ray range.

32. The light transmission type vacuum separating window according to claim 23, wherein said light wavelength range is an infrared ray range.

33. The light transmission type vacuum separating window according to claim 23, wherein said light wavelength range is a visible ray range.

34. The light transmission type vacuum separating window according to claim 23, wherein said light wavelength range is an ultraviolet ray range.

35. The light transmission type vacuum separating window according to claim 34, wherein said ultraviolet ray range is a vacuum ultraviolet ray range.

36. A light transmission type vacuum separating window for separating vacuum areas, comprising:
   a film transmitting a light wavelength range;
   a support member for supporting said film; and
   a metal or an alloy provided between said film and said support member and being in a liquid state in a range of temperatures of use of the vacuum separating window.

37. The light transmission type vacuum separating window according to claim 36, wherein at least any one of the vacuum areas is an ultra high vacuum area on the order of $10^7$ torr or more.

38. The light transmission type vacuum separating window according to claim 36, wherein a thickness of said film is 1 $\mu$m or under.

39. The light transmission type vacuum separating window according to claim 36, wherein said film exhibits a heat resistant property against temperatures of 100° C. or more.

40. A light transmission type vacuum separating window for separating vacuum areas, comprising:
   a film transmitting a light wavelength range; and
   a support member for supporting said film; and gallium or an alloy comprising gallium provided between said film and said support member.

41. The light transmission type vacuum separating window according to claim 40, wherein at least any one of the vacuum areas is an ultra high vacuum area on the order of $10^7$ torr or more.

42. The light transmission type vacuum separating window according to claim 40, wherein a thickness of said film is 1 $\mu$m or under.

43. The light transmission type vacuum separating window according to claim 40, wherein said film exhibits a heat resistant property against temperatures of 100° C. or more.

44. A light transmission type vacuum separating window for separating vacuum areas, comprising:
   a film transmitting a light wavelength range;
   a support substance for supporting said film; and
   wherein a metal or an alloy that is in a liquid state in a range of temperatures of use of the vacuum separating window is provided between said film and a support member for supporting said film.

45. The light transmission type vacuum separating window according to claim 43 wherein the metal or alloy comprises gallium.

46. The light transmission type vacuum separating window according to claim 43, wherein at least any one of the vacuum areas is an ultra high vacuum area on the order of $10^7$ torr or more.

47. The light transmission type vacuum separating window according to claim 43, wherein a thickness of said film is 1 $\mu$m or under.

48. The light transmission type vacuum separating window according to claim 43, wherein said film exhibits a heat resistant property against temperatures of 100° C. or more.

* * * * *